(12) United States Patent
An

(10) Patent No.: US 11,457,151 B2
(45) Date of Patent: Sep. 27, 2022

(54) METHOD OF OBTAINING A USER-SELECTED ANGLE OF VIEW FROM AMONG A PLURALITY OF ANGLES OF VIEW OF RESPECTIVE CAMERAS AND ELECTRONIC DEVICE SUPPORTING THE SAME

(71) Applicant: Samsung Electronics Co., Ltd., Suwon-si (KR)

(72) Inventor: Sungwook An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/788,089

(22) Filed: Feb. 11, 2020

(65) Prior Publication Data
US 2020/0260015 A1    Aug. 13, 2020

(30) Foreign Application Priority Data
Feb. 11, 2019    (KR) .................. 10-2019-0015611

(51) Int. Cl.
*H04N 5/232*    (2006.01)
*H04N 5/225*    (2006.01)
*H04N 5/262*    (2006.01)

(52) U.S. Cl.
CPC ..... *H04N 5/232935* (2018.08); *H04N 5/2258* (2013.01); *H04N 5/23245* (2013.01); *H04N 5/2628* (2013.01)

(58) Field of Classification Search
CPC ........... H04N 5/232935; H04N 5/2258; H04N 5/23245; H04N 5/2628; H04N 5/23229;
(Continued)

(56) References Cited

U.S. PATENT DOCUMENTS 9,729,781 B2    8/2017    Cho et al.
10,484,600 B2   11/2019   Baek et al.
(Continued)

FOREIGN PATENT DOCUMENTS

CN    106303258 A    1/2017
EP    2976766 A1     1/2016
(Continued)

OTHER PUBLICATIONS

International Search Report dated May 26, 2020 in connection with International Patent Application No. PCT/KR2020/001837, 3 pages.
(Continued)

*Primary Examiner* — Gevell V Selby

(57) ABSTRACT

An electronic device including: a housing; a first camera having a first angle of view; a second camera having a second angle of view that is smaller than the first angle of view; a touchscreen display; and a processor. The processor is configured to: based on a photographing direction of the first camera and a photographing direction of the second camera being substantially the same, activate the first camera; display a first image acquired via the first camera on the display; acquire a second image by cropping the first image in accordance with the second angle of view, in response to reception of a first input event; display the second image on the display; activate the second camera in response to reception of a second input event; and display a third image acquired via the second camera on the display.

20 Claims, 14 Drawing Sheets

(58) Field of Classification Search
CPC ........... H04N 5/23296; H04N 5/23241; H04N 5/23293; H04N 5/23216; H04M 2250/52; H04M 1/72439
See application file for complete search history.

(56) References Cited

U.S. PATENT DOCUMENTS

| | | |
|---|---|---|
| 2007/0140675 A1 | 6/2007 | Yanagi |
| 2010/0277619 A1 | 11/2010 | Scarff |
| 2016/0301832 A1 | 10/2016 | Xu |
| 2016/0381289 A1 | 12/2016 | Kim et al. |
| 2017/0013179 A1* | 1/2017 | Kang ............... H04N 5/247 |
| 2017/0034449 A1* | 2/2017 | Eum ............... H04N 5/23238 |
| 2017/0052566 A1* | 2/2017 | Ka ............... G06F 1/1694 |
| 2017/0163872 A1 | 6/2017 | Kim et al. |
| 2017/0318226 A1* | 11/2017 | Jung ............... H04N 5/23212 |
| 2017/0353633 A1 | 12/2017 | Eromaki |
| 2018/0070009 A1 | 3/2018 | Baek et al. |
| 2018/0152623 A1* | 5/2018 | Li ............... H04N 5/23293 |
| 2018/0154900 A1 | 6/2018 | Lee et al. |
| 2018/0359423 A1 | 12/2018 | Shabtay et al. |
| 2018/0376122 A1* | 12/2018 | Park ............... H04N 5/232945 |
| 2019/0020823 A1 | 1/2019 | Jeon |
| 2019/0222742 A1* | 7/2019 | Kim ............... H04N 5/23212 |

FOREIGN PATENT DOCUMENTS

| | | |
|---|---|---|
| EP | 3116215 A2 | 1/2017 |
| EP | 3328063 A1 | 5/2018 |
| EP | 3627816 A1 | 3/2020 |
| JP | 2017-011464 A | 1/2017 |
| KR | 10-2018-0027978 A | 3/2018 |
| KR | 10-2216246 B1 | 2/2021 |
| WO | 2014/148698 A1 | 9/2014 |

OTHER PUBLICATIONS

Written Opinion of the International Searching Authority dated May 26, 2020 in connection with International Patent Application No. PCT/KR2020/001837, 5 pages.
European Search Report dated May 27, 2020 in connection with European Patent Application No. 20 15 6385, 9 pages.
Communication pursuant to Article 94(3) EPC dated Apr. 13, 2021 in connection with European Patent Application No. 20156385.5, 6 pages.
Summons to attend oral proceedings pursuant to Rule 115(1) EPC dated Jun. 8, 2022 in connection with European Patent Application No. 20 156 385.5, 6 pages.

* cited by examiner

METHOD OF OBTAINING A USER-SELECTED ANGLE OF VIEW FROM AMONG A PLURALITY OF ANGLES OF VIEW OF RESPECTIVE CAMERAS AND ELECTRONIC DEVICE SUPPORTING THE SAME

CROSS-REFERENCE TO RELATED APPLICATION

This application is based on and claims priority under 35 U.S.C. 119 to Korean Patent Application No. 10-2019-0015611 filed on Feb. 11, 2019 in the Korean Intellectual Property Office, the disclosure of which is herein incorporated by reference in its entirety.

BACKGROUND

1. Field

Various embodiments relate to a screen providing technique.

2. Description of Related Art

The following information is presented as background information only to assist with an understanding of the disclosure. No determination has been made, and no assertion is made, as to whether any of the above might be applicable as prior art with regard to the disclosure.

In recent years, the spread of electronic devices equipped with a camera, such as a digital camera, a digital camcorder, or a smart phone, has been actively performed. An electronic device equipped with such a camera may provide a photographing function. For example, the electronic device may output a preview screen on a display by using an image acquired in real time from a camera, and may acquire a captured image from the camera when a photographing input is received.

The electronic device may include a plurality of cameras. For example, the electronic device may include a plurality of cameras having different angles of view. Each of the plurality of cameras may capture an image at a different angle of view for the same subject. The electronic device may acquire, using images captured at different angles of view, an image having different characteristics (for example, a high quality, a wide viewing angle, stereoscopicity, or the like) from those of an image captured by one camera.

The electronic device including a plurality of cameras may provide a preview screen associated with selection of a camera, by using images captured by a plurality of cameras which have different angles of views but capture images in the same direction or similar directions. Accordingly, a user may check images of different angles of view provided from the preview screen, and may select an image of a desired angle of view, and the electronic device may support the user to capture an image of the desired angle of view.

SUMMARY

In order to provide a preview screen related to selection of a camera, a conventional electronic device physically switches a plurality of cameras to photographing cameras to acquire images captured by the respective cameras, and allows the preview screen to be configured using the acquired images. Accordingly, when the conventional electronic device provides a preview screen related to selection of a camera, switching between cameras may take time, and an increase in current consumption and a heat generation problem may occur.

In relation to providing a preview screen associated with selection of a camera, various embodiments may provide a screen providing method for providing a preview view screen by using an image captured by a camera having an angle of view greater than that of a camera that is to provide the preview image, and an electronic device supporting the same.

An electronic device according to various embodiments may include: a housing; a first camera having a first angle of view; a second camera having a second angle of view that is smaller than the first angle of view; a touchscreen display; and a processor functionally connected to the first camera, the second camera, and the display, wherein the processor is configured to: in a state where a photographing direction of the first camera and a photographing direction of the second camera are substantially the same, activate the first camera; display a first image acquired via the first camera on the display; acquire a second image by cropping the first image in accordance with the second angle of view, in response to reception of a first input event; display the second image on the display; activate the second camera in response to reception of a second input event; and display a third image acquired via the second camera on the display.

A screen providing method of an electronic device according to various embodiments may include: in a state where a photographing direction of a first camera having a first angle of view and a photographing direction of a second camera having a second angle of view that is smaller than the first angle of view are substantially the same, activating the first camera; displaying a first image acquired via the first camera on a display; acquiring a second image by cropping the first image in according with the second angle of view, in response to reception of a first input event; displaying the second image on the display; activating the second camera in response to reception of a second input event; and displaying a third image acquired via the second camera on the display.

According to various embodiments, by providing a preview screen related to selection of a camera without switching between cameras, a time required to switch between the cameras can be eliminated and a heat generation phenomenon can be reduced.

In addition, various effects directly or indirectly identified via the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In relation to the description of the drawings, the same or similar reference numerals may be used for the same or similar elements.

DETAILED DESCRIPTION

Figure 1:
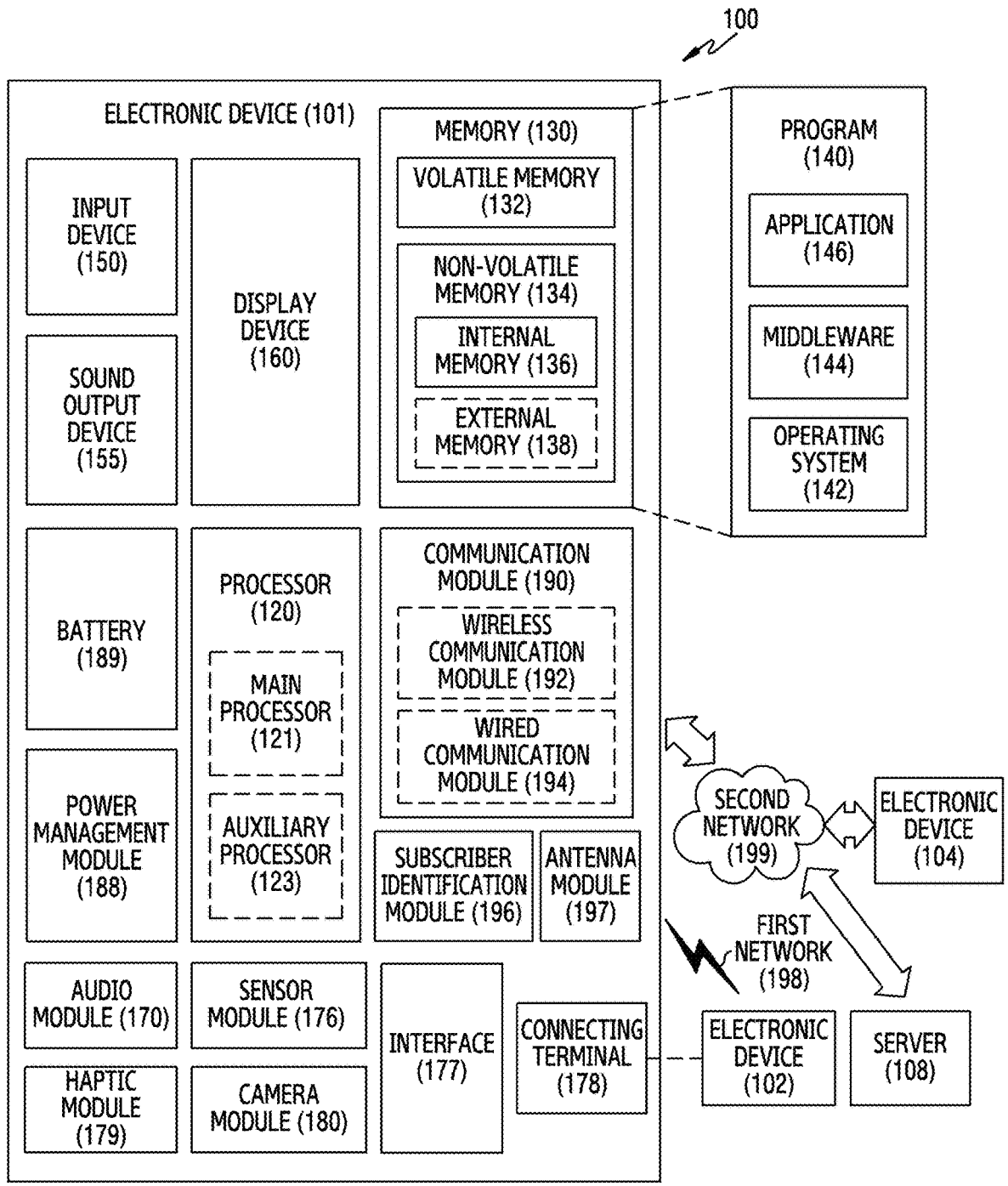
FIG. 1 illustrates a block diagram of an electronic device in a network environment according to various embodiments.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described with reference to the accompanying drawings. For the convenience of description, elements illustrated in the drawings may be exaggerated or reduced in size, and the disclosure is not necessarily limited to the illustration.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
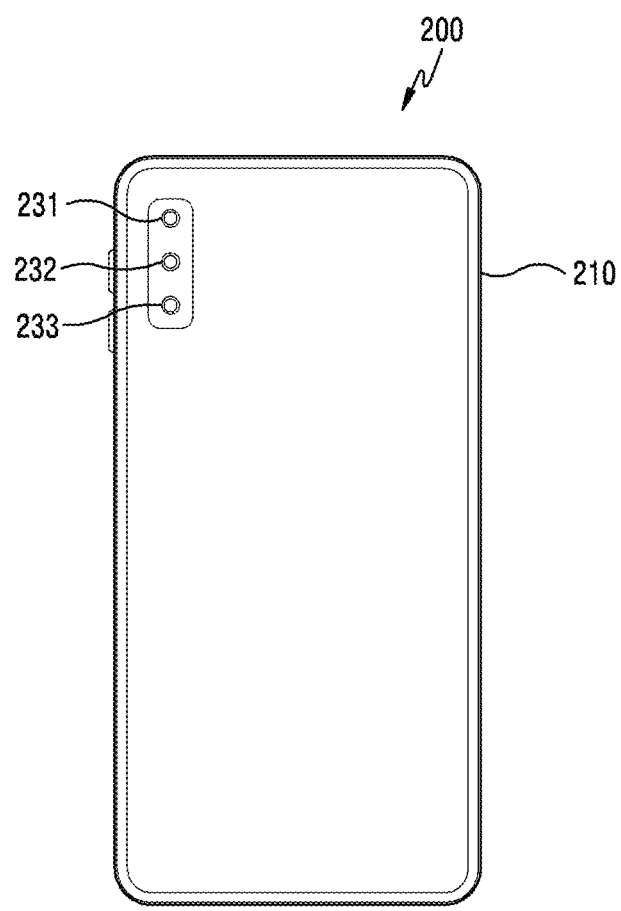
FIG. 2 is a diagram illustrating an electronic device in which a plurality of cameras are disposed according to an embodiment.
Figure 3:
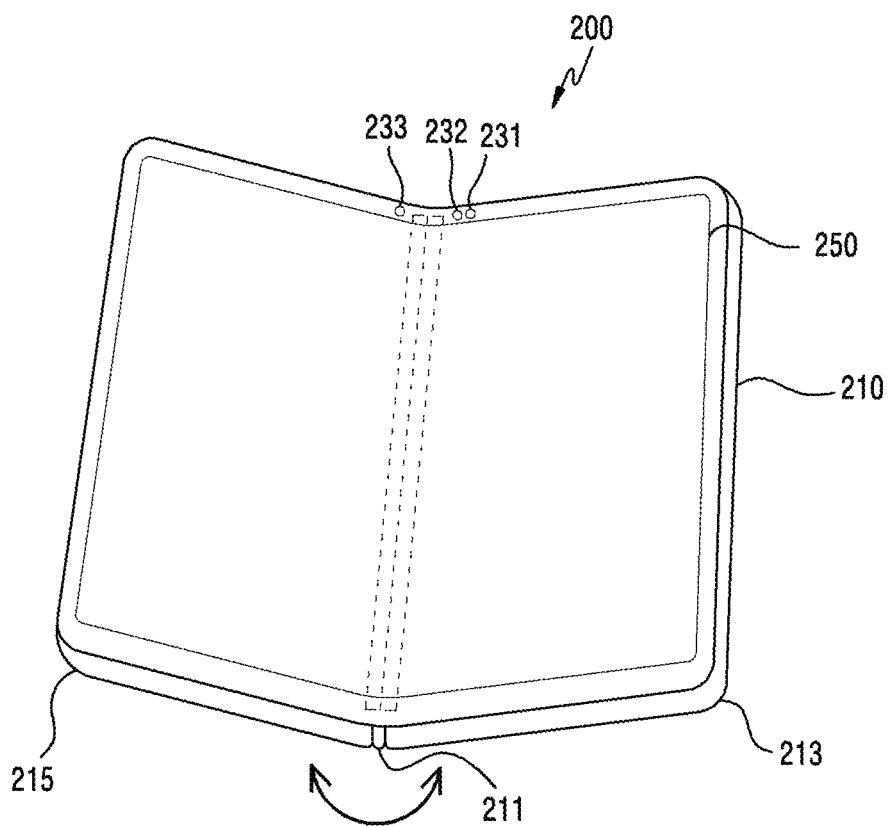
FIG. 3 is a diagram illustrating a foldable electronic device in which a plurality of cameras are disposed according to an embodiment.

FIG. 2 is a diagram illustrating an electronic device in which a plurality of cameras are disposed according to an embodiment, and FIG. 3 is a diagram illustrating a foldable electronic device in which a plurality of cameras are disposed according to an embodiment.

Referring to FIG. 2 and FIG. 3, an electronic device 200 (e.g., the electronic device 101) may include a plurality of cameras (e.g., a first camera 231, a second camera 232, or a third camera 233) disposed on at least one surface of a housing 210. FIG. 2 and FIG. 3 illustrate a state in which three cameras are disposed in the housing 210, but the number of cameras is not limited thereto.

The housing 210 may form an exterior of the electronic device 200, and may provide a space in which internal elements of the electronic device 200 (e.g., the processor 120, the memory 130, etc.) are seated. The housing 210 may protect the internal elements from external shock.

The housing 210 may include a front surface, a back surface, and a side surface at least partially surrounding a space between the front surface and the back surface. The side surface refers to a surface that is visually seen when observed at the thin surface of the electronic device 200, the front surface, although not shown in FIG. 2, is an area excluding the side surface and refers to a surface on which a screen output via a display is exposed to the outside, and the rear surface is a surface facing the front surface as shown in FIG. 2. In some embodiments, a part of the screen of the display may be exposed to the outside through the back surface and/or the side surface, but the front surface may be provided, unlike the back surface and/or the side surface, so that most of the area thereof is able to output the screen of the display.

As illustrated in FIG. 3, if the electronic device 200 is a foldable electronic device, the housing 210 may include a first housing 213 and a second housing 215 disposed on both sides of a hinge part 211. Each of the first housing 213 and the second housing 215 may include a front surface, a back surface, and a side surface at least partially surrounding a space between the front surface and the back surface. The electronic device 200 may provide a first state (unfolded state), in which the first housing 213 and the second housing 215 are unfolded around the hinge part 211 so that the front surface of the first housing 213 and the front surface of the second housing 215 form substantially the same plane, and a second state (folded state) in which the first housing 213 and the second housing 215 are folded around the hinge part 211 so that the front surface of the first housing 213 and the front surface of the second housing 215 face each other.

A display 250 may be disposed on at least one surface of the first housing 213 and at least one surface of the second housing 215. According to an embodiment, the display 250 may include a first display disposed on the front surface of the first housing 213 and a second display disposed on the front surface of the second housing 215. In an embodiment, the display 250 may include a flexible display. The display 250 is disposed from the front surface of the first housing 213 to the front surface of the second housing 215 across the hinge part 211, and may be folded or unfolded together by an opening/closing operation (switching to the first state or the second state) of the electronic device 200. In some embodiments, the display 250 may further include a third display disposed on at least one of the back surface of the first housing 213 or the back surface of the second housing 215.

The plurality of cameras (e.g., the first camera 231, the second camera 232, or the third camera 233) may capture still images or moving images. To this end, each of the cameras may include an imaging element. The imaging device may include at least one among, for example: a lens that receives image light of a subject and forms the same into an image; an aperture that adjusts the amount of light passing through the lens; a shutter that functions to open and close the aperture so that an image sensor is exposed to light passing through the lens for a predetermined time; an image sensor which receives, as an optical signal, an image formed on the lens; and an internal memory.

The plurality of cameras may be disposed on one surface of the housing 210. For example, as illustrated in FIG. 2, the plurality of cameras may be disposed on the back surface of the housing 210. As another example, the plurality of cameras may be disposed on the front surface of the housing 210. As still another example, a part of the plurality of cameras may be disposed on the front surface of the housing 210, and the other part of the cameras may be disposed on the back surface of the housing 210. For example, as illustrated in FIG. 2, the first camera 231, the second camera 232, and the third camera 233 may be disposed on the back surface of the housing 210, and at least one fourth camera may be disposed on the front surface of the housing 210. At least one fifth camera may further be disposed on the back surface of the housing 210 in addition to the first camera 231, the second camera 232, and the third camera 233.

If the electronic device 200 is a foldable electric device, the plurality of cameras may be disposed on at least one surface of the first housing 213 and the second housing 215. As an example, the plurality of cameras may be disposed on the front surface or back surface of the first housing 213. A part of the plurality of cameras may be disposed on the front surface of the first housing 213, and the other part of the cameras may be disposed on the back surface of the first housing 213. As another example, the plurality of cameras may be disposed on the front surface or back surface of the second housing 215. A part of the plurality of cameras may be disposed on the front surface of the second housing 215, and the other part of the cameras may be disposed on the back surface of the second housing 215. As still another example, as illustrated in FIG. 3, a part of the plurality of cameras (e.g., the first camera 231 and the second camera 232) may be disposed on the front surface of the first housing 213, and the other part of the cameras (e.g., the third camera 233) may be disposed on the front surface of the second housing 215. A part of the plurality of cameras may be disposed on the back surface of the first housing 213, and the other part of the cameras may be disposed on the back surface of the second housing 215. A part of the plurality of cameras may be disposed on the front surface (or back surface) of the first housing 213, and the other part of the cameras may be disposed on the back surface (or front surface) of the second housing 215.

Hereinafter, descriptions are provided for a case of a plurality of cameras, which have different angles of view but capture images in the same photographing direction or similar photographing directions, from among the plurality of cameras. For example, if the plurality of cameras capture images in the same photographing direction or similar photographing directions, a case where the plurality of cameras are disposed on the same surface (e.g., the back surface) of the housing 210, as illustrated in FIG. 2, may be included. As another example, if the electronic device 200 is a foldable electronic device, in a case where the plurality of cameras capture images in the same photographing direction or similar photographing directions, when the electronic device 200 is in the first state (unfolded state) as illustrated in FIG. 3, a case where the plurality of cameras are disposed on the front surface (or back surface) of the first housing 213 and the front surface (or back surface) of the second housing 215, which form substantially the same plane, may be included. As another example, if the electronic device 200 is a foldable electronic device, in a case where the plurality of cameras capture images in the same photographing direction or similar photographing directions, when the electronic device 200 is in the second state (folded state), a case where the plurality of cameras are disposed on the back surface of the first housing 213 and the back surface of the second housing 215 may be included.

Because the plurality of cameras are physically spaced apart from each other with different angles of view, images of different compositions may be captured. Accordingly, in the disclosure, it is preferable that the plurality of cameras have different angles of view but are disposed adjacent to each other within a predetermined distance so that the central axes in the composition of captured images may be the same or similar. For example, the plurality of cameras may be disposed, as shown in FIG. 2, adjacent to each other within a predetermined distance on the same surface of the housing 210, or when the electronic device 200 is in the unfolded state, as shown in FIG. 3, the plurality of cameras may be disposed adjacent to each other within a predetermined distance on the front surface (or back surface) of the first housing 213 and the front surface (or back surface) of the second housing 215 which form substantially the same plane.

Figure 4:
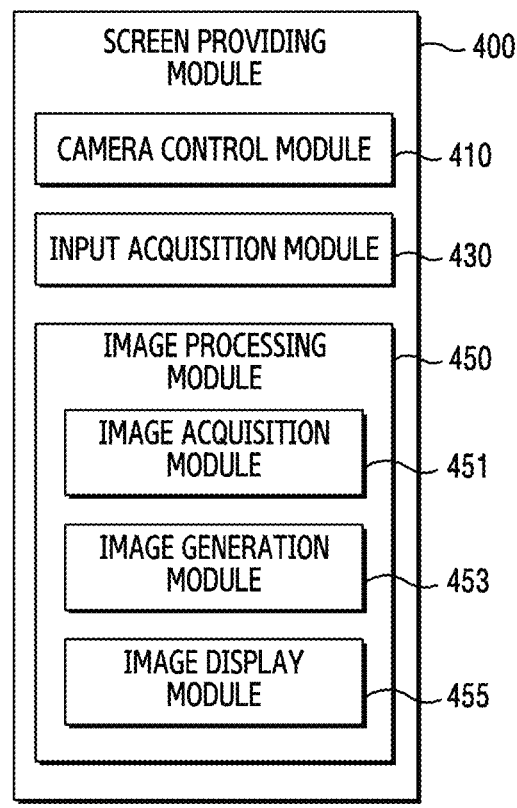
FIG. 4 is a diagram illustrating a screen providing module according to an embodiment.

FIG. 4 is a diagram illustrating a screen providing module according to an embodiment. A screen providing module 400 of FIG. 4 may be implemented as a hardware or software element of the electronic device 101 (or the electronic device 200 of FIG. 2 and FIG. 3) described in FIG. 1. For example, the screen providing module 400 may be implemented in the form of the program 140 stored in the memory 130 of the electronic device 101. For example, the screen providing module 400 may be implemented with instructions stored in the memory 130, and the instructions may allow, when executed, the processor 120 to perform a function corresponding to the instructions.

The screen providing module 400 may control the plurality of cameras (e.g., the camera module 180, the first camera 231, the second camera 232, or the third camera 233) included in the electronic device (e.g., the electronic device 101 or the electronic device 200), may acquire a user input, and may perform a function related to image processing. Referring to FIG. 4, the screen providing module 400 may include a camera control module 410, an input acquisition module 430, and an image processing module 450.

The camera control module 410 may control activation/deactivation of a camera. According to an embodiment, the camera control module 410 may apply power to the camera to activate the same so that the camera acquires an image. An activated state of the camera may be, for example, a state in which data or instructions related to the camera are loaded in a memory (e.g., the volatile memory 132) and processed. In this state, the activated camera may be configured to be a photographing camera that provides a captured image by a selection input of a user or configured information. Further, the camera control module 410 may deactivate the activated camera by cutting off power applied to the activated camera. The deactivated state of the camera may be, for example, a state in which the data or instructions related to the camera, which are loaded in the memory (e.g., the volatile memory 132), are removed or not referenced. According to an embodiment, the camera control module 410 may switch the activated camera to a standby state. For example, the camera control module 410 may temporarily cut off power applied to the activated camera so as to switch the activated camera to the standby state. The standby state of the camera may be, for example, a state in which the data or instructions related to the camera, which are loaded in the memory (e.g., the volatile memory 132), are not removed but processing the same is temporarily suspended.

The camera control module 410 may control a switching operation between the plurality of cameras. According to an embodiment, the camera control module 410 may switch a photographing camera from the first camera to the second camera. For example, in a state where the activated first camera is configured to be a photographing camera, the camera control module 410 may deactivate the first camera, may switch the first camera to the standby state, or may configure the activated second camera to be the photographing camera.

The input acquisition module 430 may acquire a user input. According to an embodiment, the input acquisition module 430 may receive a key input of a user via a physical key included in an input device (e.g., the input device 150), or may receive a voice input of the user via a microphone included in the input device. In an embodiment, the input acquisition module 430 may receive a touch input of the user, a pinch gesture input (or a zoom input), etc., via a display (e.g., the display device 160 or the display 250). The touch input may be an input of pressing and releasing a point on the screen of the display within a predetermined time by means of a touch object (e.g., a finger or an electronic pen). The pinch gesture input may be an input of, while pressing two points on the screen of the display by using touch objects (e.g., two fingers), moving the touch objects by a predetermined distance and then releasing the same. The pinch gesture input may be divided into a pinch-in input and a pinch-out input according to a direction in which the touch objects are moved. The pinch-in input may be an input in which the touch objects move in a direction closer to each other, and the pinch-out input may be an input in which the touch objects move in a direction away from each other.

The input acquisition module 430 may receive an input event according to an operation of a user input. In an embodiment, when the touch input is generated, the input acquisition module 430 may receive an event (e.g., a single touch-down event) related to a touch start at a point in time when the touch object presses a point on the screen of the display, and may receive an event (e.g., a single touch-up event) related to a touch end at a point in time when the touch object is separated from the screen of the display. In an embodiment, when the pinch gesture input is generated, the input acquisition module 430 may receive an event (e.g., a multi-touch-down event (or substantially two single-touch-down events that are concurrently received)) related to a start of the pinch gesture input at a point in time when the touch objects press two points on the screen of the display, and may receive an event (e.g., a multi-touch-up event (or substantially two single-touch-up-events that are concurrently received)) related to an end of the pinch gesture input at a point in time when the touch objects are separated from the screen of the display.

The image processing module 450 may perform a function related to image acquisition, image generation, and image display. The image processing module 450 may include an image acquisition module 451, an image generation module 453, and an image display module 455.

The image acquisition module 451 may acquire an image from a camera. According to an embodiment, the image acquisition module 451 may acquire a preview image from an activated camera. In an embodiment, the image acquisition module 451 may acquire, from an activated camera, a reference image for configuration of a preview screen. In an embodiment, the image acquisition module 451 may acquire an image captured by a camera configured to be a photographing camera. The reference image may be, for example, an image for generation of virtual preview images corresponding to angles of view of a plurality of cameras, respectively. In an embodiment, the reference image may be acquired from a camera having a greatest angle of view from among the plurality of cameras. In an embodiment, the reference image may be acquired from a camera having an angle of view greater than that of a camera that is to provide a virtual preview image from among the plurality of cameras.

The image generation module 453 may generate virtual preview images corresponding to angles of view of the plurality of cameras, respectively, by using the reference image. According to an embodiment, the image generation module 453 may generate virtual preview images corresponding to angles of view of the plurality of cameras, respectively, by cropping the reference image acquired from the camera having the greatest angle of view from among the plurality of cameras. For example, in the electronic device 200 equipped with the first camera 231 having a first angle of view, the second camera 232 having a second angle of view that is smaller than the first angle of view, and the third camera 233 having a third angle of view that is smaller than the second angle of view, the image generation module 453 may generate a virtual preview image corresponding to the second angle of view and a virtual preview image corresponding to the third angle of view by cropping the reference image acquired from the first camera 231. In an embodiment, the image generation module 453 may generate a virtual preview image by cropping a reference image acquired from a camera having an angle of view greater than that of a camera which is to provide the virtual preview image from among the plurality of cameras. For example, in the electronic device 200 equipped with the first camera 231 having a first angle of view, the second camera 232 having a second angle of view that is smaller than the first angle of view, and the third camera 233 having a third angle of view that is smaller than the second angle of view, the image generation module 453 may generate a virtual preview image corresponding to the second angle of view and a virtual preview image corresponding to the third angle of view by cropping a reference image acquired from the first camera 231 having the angle of view which is greater than the second angle of view and the third angle of view. Alternatively, the image generation module 453 may generate a virtual preview image corresponding to the third angle of view by cropping a reference image acquired from the second camera 232 having the second angle of view which is greater than the third angle of view.

The image generation module 453 may configure a preview screen that is to be displayed on the display. According to an embodiment, the image generation module 453 may configure the preview screen by using the preview image. According to an embodiment, the image generation module 453 may configure the preview screen to include the preview image and the virtual preview image. For example, the image generation module 453 may arrange the preview image in at least a partial area (including the entire area) of the preview screen, and may arrange the virtual preview image in a partial area (e.g., an upper area) of the preview screen. The image generation module 453 may overlappingly arrange the virtual preview image on the preview image. In an embodiment, the image generation module 453 may configure the preview screen with the preview image or the virtual preview image. For example, the image generation module 453 may configure a first preview screen with the preview image, and may configure a second preview screen with the virtual preview image. If there are a plurality of virtual preview images, there may be a plurality of second preview screens as well.

The image display module 455 may display an image on the display. According to an embodiment, the image display module 455 may display, on the display, a preview image acquired via the image acquisition module 451. In an embodiment, the image display module 455 may display, on the display, a preview screen configured via the image generation module 453.

According to an embodiment, in a state where the image display module 455 displays, on the display, the first preview screen including the first preview image, if a first user input (a first input event) is received via the input acquisition module 430, the image display module 455 may display, on the display, the first preview screen on which the virtual preview image is disposed in a partial area (e.g., an upper area) of the first preview screen. Thereafter, if a second user input (a second input event) for selecting the virtual preview screen is received on the first preview screen, the image display module 455 may display, on the display, the second preview screen including a second preview image acquired from a camera having an angle of view corresponding to the virtual preview screen. The first user input (the first input event) may be a first key input (a first key input event), a first voice input (a first voice input event), or a first touch input (a first single touch-down event or a first single touch-up event), which requests virtual preview images for a plurality of cameras, and the second user input (the second input event) may be a second key input (a second key input event), a second voice input (a second voice input event), or a second touch input (a second single touch-down event or a second single touch-up event), which selects one of the virtual preview images.

According to an embodiment, in a state where the image display module 455 displays, on the display, the first preview screen including the first preview image, if the first input event of a user input is received via the input acquisition module 430, the image display module 455 may display, on the display, the second preview screen including the virtual preview image. Thereafter, if the second input event of the user input is received on the second preview screen, the image display module 455 may display, on the display, a third preview screen including a second preview image acquired from a camera having an angle of view corresponding to the virtual preview image. The first input event may be an event (e.g., a multi-touch-down event) related to a start of a pinch gesture input (or a zoom input) requesting a zoom operation on the first preview screen, and the second input event may be an event (e.g., a multi-touch-up event) related to an end of the pinch gesture input requesting to end the zoom operation.

As described above, according to various embodiments, an electronic device (e.g., the electronic device 101 or the electronic device 200) may include: a housing (the housing 210); a first camera (e.g., the camera module 180) or the first camera 231) having a first angle of view; a second camera (e.g., the camera module 180 or the second camera 232) having a second angle of view that is smaller than the first angle of view; a touchscreen display (e.g., the display device 160 or the display 250); and a processor (e.g., the processor 120) functionally connected to the first camera, the second camera, and the display, wherein the processor is configured to: in a state where a photographing direction of the first camera and a photographing direction of the second camera are substantially the same, activate the first camera; display a first image acquired via the first camera on the display; acquire a second image by cropping the first image in accordance with the second angle of view, in response to reception of a first input event; display the second image on the display; activate the second camera in response to reception of a second input event; and display a third image acquired via the second camera on the display.

According to various embodiments, the first input event may be generated according to a first touch input made at a point on the screen of the display, and the second input event may be generated according to a second touch input made at a position where the second image of the screen is displayed.

According to various embodiments, the processor may be configured to overlappingly arrange the second image in a partial area of the first image, so as to display the same on the display.

According to various embodiments, the first input event is generated at a first time point at which touch objects are contacted at two points on the screen of the display, and the second input event may be generated at a second time point at which the touch objects are moved in different directions from each other, and then separated from the screen.

According to various embodiments, the processor may be configured to: acquire a plurality of fourth images by cropping the first image in accordance with a plurality of angles of view included in the range of the first angle of view and the second angle of view; and display a fourth image, which corresponds to an angle of view matched to a distance of the touch objects from among the fourth images, on the display from the first time point to the second time point.

According to various embodiments, the processor may be configured to deactivate the first camera or switch the first camera to the standby state, in response to reception of the second input event.

According to various embodiments, the processor may be configured to, before reception of the first input event, activate the second camera, and switch the activated second camera to the standby state.

According to various embodiments, the electronic device may further include a third camera (e.g., the camera module 180 or the third camera 233) which is functionally connected to the processor and has a third angle of view greater than the first angle of view, wherein the processor is configured to: in a state where a photographing direction of the third camera is substantially the same as a photographing direction of the first camera and a photographing direction of the second camera, activate the third camera in response to reception of the first input event; acquire a fourth image from the activated third camera; acquire a fifth image by cropping the fourth image in accordance with the first angle of view; acquire the second image by cropping the fourth image in accordance with the second angle of view; and display at least one of the second image or the fifth image on the display.

According to various embodiments, the processor is configured to, in a state where the second image and the fifth image are displayed on the display, apply a graphic effect to one of the second image and the fifth image on the basis of at least one of an object to be photographed or a user's preference.

According to various embodiments, the electronic device may further include a third camera (e.g., the camera module 180 or the third camera 233) which is functionally connected to the processor and has an angle of view which is smaller than the first angle of view but greater than the second angle of view, wherein the processor is configured to: in a state where a photographing direction of the third camera is substantially the same as a photographing direction of the first camera and a photographing direction of the second camera, activate the third camera in response to reception of the first input event; acquire a fourth image from the activated third camera; and acquire the second image by cropping the fourth image in accordance with the second angle of view.

Figure 5:
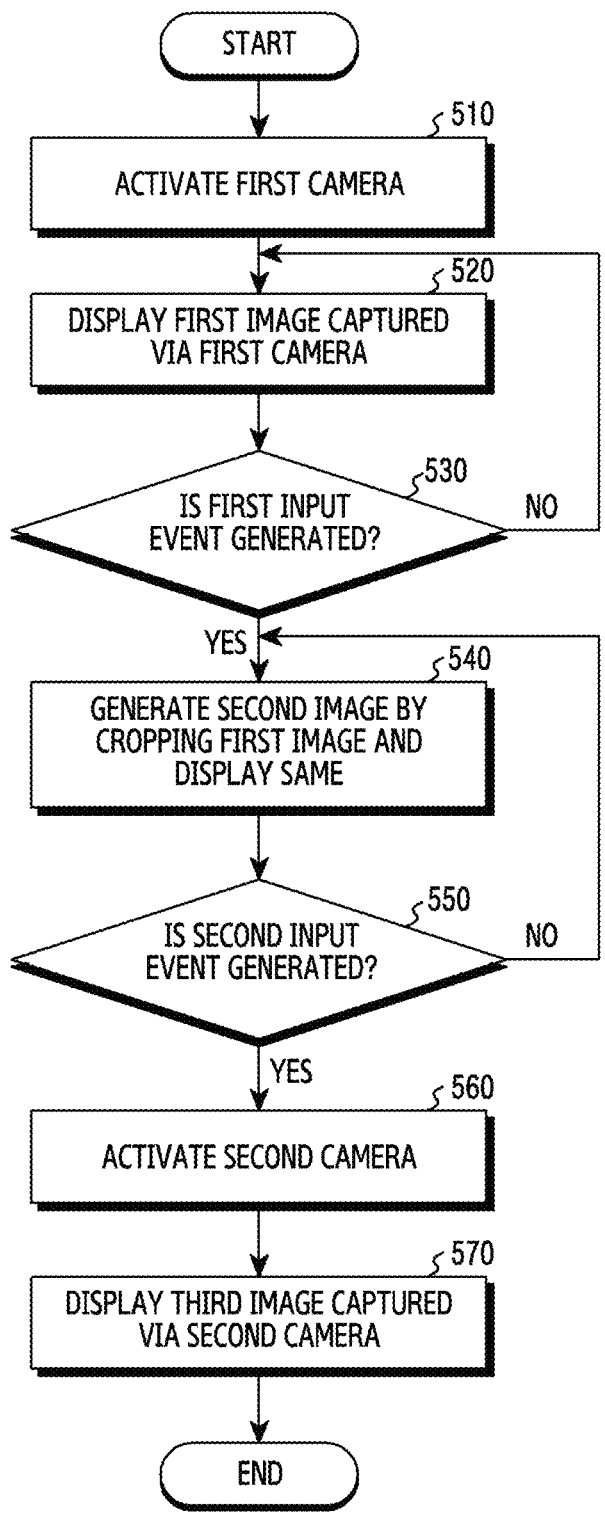
FIG. 5 illustrates a diagram for describing a method of providing a preview screen related to camera selection by using a camera which provides a preview image according to an embodiment.

FIG. 5 illustrates a diagram for describing a method of providing a preview screen related to camera selection by using a camera which provides a preview image according to an embodiment.

Referring to FIG. 5, an electronic device (e.g., the electronic device 101 or the electronic device 200) may activate, in operation 510, a first camera (e.g., the first camera 231) via the camera control module 410 of the screen providing module 400. The first camera has a first angle of view, and may be a camera last used by a user. For example, the first camera may be a camera that last provided a preview image via a display (e.g., the display device 160 or the display 250) of the electronic device. That is, the first camera may be a camera configured to be a photographing camera. According to an embodiment, the first camera may have a greatest angle of view among a plurality of cameras included in the electronic device.

If the first camera is activated, the electronic device may acquire a first image from the first camera via the image acquisition module 451 of the screen providing module 400. If the first image is acquired, the electronic device may display, in operation 520, the acquired first image on the display via the image display module 455 of the screen providing module 400. For example, the image display module 455 may display, on the display, a first preview screen configured by the first image.

In operation 530, the electronic device may determine whether a first input event has been generated, via the input acquisition module 430 of the screen providing module 400. For example, the input acquisition module 430 may determine whether a first key input (a first key input event) has been received via a physical key included in an input device (e.g., the input device 150), whether a first voice input (a first voice input event) has been received via a microphone included in the input device, whether a first touch input (a first single touch-down event or a first single touch-up event) has been received via the display, or whether an event (a multi-touch-down event) related to a start of a pinch gesture input has been received via the display.

In response to determining that the first input event has not occurred, the electronic device may return to operation 520 to display the first image on the display. The electronic device may reacquire the first image from the first camera via the image acquisition module 451, and may display the reacquired first image on the display via the image display module 455.

In response to determining that the first input event has occurred, the electronic device may generate a second image by cropping the first image via the image generation module 453 of the screen providing module 400, and may display the generated second image on the display via the image display module 455, in operation 540. The first image may be a reference image, and the second image may be a virtual preview image. The second image may include an image corresponding a second angle of view that is smaller than the first angle of view. The second image may include an image (e.g., an image that is not cropped) corresponding to the first angle of view.

According to an embodiment, the virtual preview image (the second image) may be generated in accordance with the number of cameras capturing images in an identical or similar photographing direction to that of the first camera among the plurality of cameras included in the electronic device. For example, if there are a plurality of cameras capturing images in an identical or similar photographing direction to that of the first camera, a plurality of virtual preview images may also be generated. The generated virtual preview images may be cropped in accordance with angles of view of the plurality of cameras, respectively. For example, if the cameras capturing images in an identical or similar photographing direction to that of the first camera include a camera (e.g., the second camera 232) having a second angle of view smaller than the first angle of view and a camera (e.g., the third camera 233) having a third angle of view smaller than the first angle of view, the image generation module 453 may generate a first virtual preview image by cropping the first image in accordance with the second angle of view, and may generate a second virtual preview image by cropping the first image in accordance with the third angle of view.

According to an embodiment, the image generation module 453 may configure a preview screen to be displayed on the display. For example, the image generation module 453 may place at least one second image in a partial area of the first preview screen. The image generation module 453 may overlappingly arrange the second image on the first image included in the first preview screen. As another example, the image generation module 453 may configure at least one second preview screen by at least one second image. For example, when a plurality of second images are generated, a plurality of second preview screens may also be configured.

According to an embodiment, the image display module 455 may process display of the second image differently according to a type of the first input event. For example, if the first input event is a key event, a voice event, or a touch input event (e.g., a single touch-down event or a single touch-up event), the image display module 455 may display, on the display, the first preview screen in which at least one second image is disposed in a partial area of the first preview screen. As another example, if the first input event is an event (e.g., a multi-touch-down event) related to a start of a pinch gesture input, the image display module 455 may display, on the display, at least one second preview screen configured by at least one second image. According to a distance between touch objects of the pinch gesture input, a second preview screen including a second image corresponding to an angle of view that is matched to the distance may be displayed on the display.

In operation 550, the electronic device may determine whether a second input event has been generated, via the input acquisition module 430. For example, the input acquisition module 430 may determine whether a second key input (a second key input event) has been received via the physical key, whether a second voice input (a second voice input event) has been received via the microphone, whether a second touch input (a second single touch-down event or a second single touch-up event) has been received via the display, or whether an event (a multi-touch-down event) related to an end of a pinch gesture input has been received via the display.

In response to determining that the second input event has not occurred, the electronic device may return to operation 540 to display the second image on the display. The electronic device may reacquire the first image from the first camera via the image acquisition module 451, may regenerate a second image by cropping the reacquired first image via the image generation module 453, and may display the regenerated second image on the display via the image display module 455. A method of displaying the second image may be identical or similar to description provided in operation 540.

In response to determining that the second input event has occurred, the electronic device may activate the second camera via the camera control module 410 in operation 560. The camera control module 410 may switch (or configure) the photographing camera from the first camera to the second camera. The second camera has an angle of view smaller than the first angle of view, and may be a camera selected by a user from among the plurality of cameras. For example, if the second touch input has occurred at a display position of the first virtual preview image, the second camera may be a camera (e.g., the second camera 232) having a second angle of view, and if the second touch input has occurred at a display position of the second virtual preview image, the second camera may be a camera (e.g., the third camera 233) having a third angle of view. As another example, when the distance between the touch objects is a first distance, if the pinch gesture input ends, the second camera is a camera (e.g., the second camera 232) having a second angle of view, and when the distance between the touch objects is a second distance, if the pinch gesture input ends, the second camera may be a camera (e.g., the third camera 233) having a third angle of view.

If the second camera is activated, the electronic device may acquire a third image from the second camera via the image acquisition module 451. If the third image is acquired, the electronic device may display, in operation 570, the acquired third image on the display via the image display module 455. For example, the image display module 455 may display, on the display, a third preview screen configured by the third image.

According to an embodiment, if the camera selected by the user from among the plurality of cameras is the first camera, the electronic device may omit execution of operation 560 and operation 570 and return to operation 520, and may display the first image on the display. At this time, the first image may be reacquired.

According to an embodiment, in operation 560, the electronic device may deactivate the first camera. For example, the electronic device may deactivate the first camera configured to be the photographing camera, and may configure the second camera to be the photographing camera while activating the second camera. In some embodiments, the electronic device may switch the first camera to the standby state, instead of deactivating the first camera.

Figure 6:
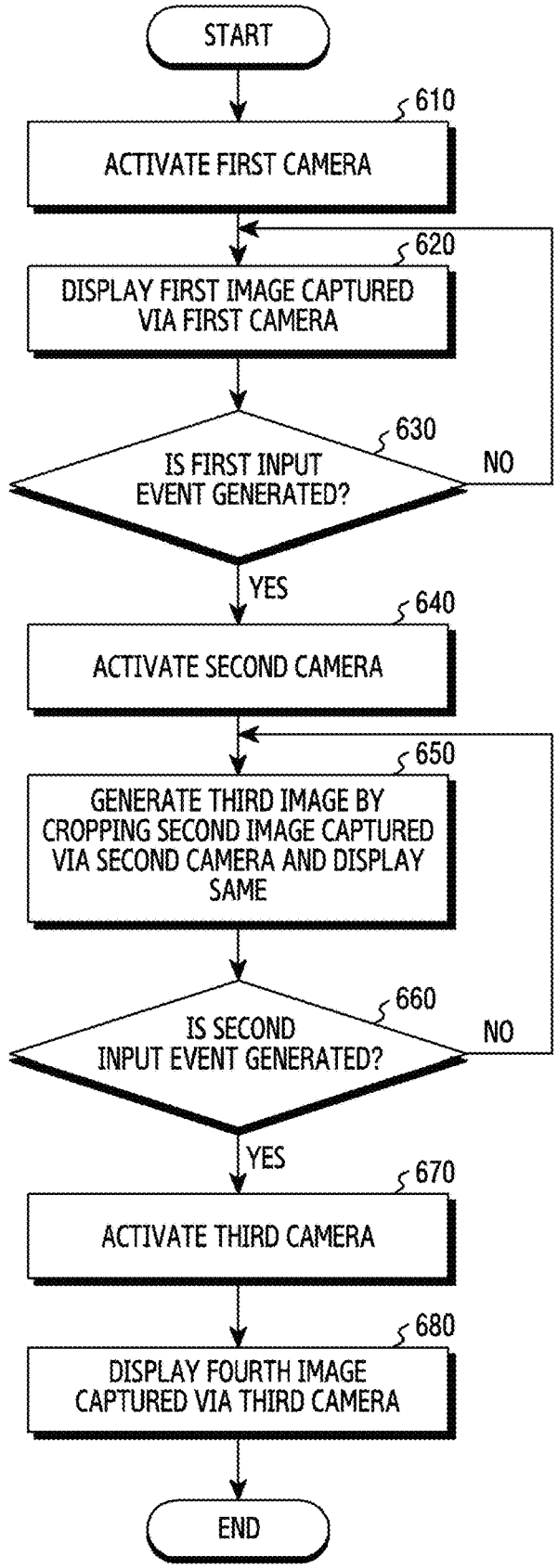
FIG. 6 illustrates a diagram for describing a method of providing a preview screen related to camera selection, by using a camera having an angle of view greater than that of a camera which provides a preview image according to an embodiment.

FIG. 6 illustrates a diagram for describing a method of providing a preview screen related to camera selection, by using a camera having an angle of view greater than that of a camera which provides a preview image according to an embodiment. In FIG. 6, the description of an operation identical or similar to that in FIG. 5 may be omitted.

Referring to FIG. 6, an electronic device (e.g., the electronic device 101 or the electronic device 200) may activate, in operation 610, a first camera (e.g., the first camera 231) via the camera control module 410 of the screen providing module 400. The first camera has a first angle of view, and may be a camera last used by a user. For example, the first camera may be a camera configured to be a photographing camera.

If the first camera is activated, the electronic device may acquire a first image from the first camera via the image acquisition module 451 of the screen providing module 400. If the first image is acquired, the electronic device may display, in operation 620, the acquired first image on the display via the image display module 455 of the screen providing module 400.

In operation 630, the electronic device may determine whether a first input event has been generated, via the input acquisition module 430 of the screen providing module 400. In response to determining that the first input event has not occurred, the electronic device may return to operation 620 to display the first image on the display. At this time, the first image may be reacquired.

In response to determining that the first input event has occurred, the electronic device may activate a second camera (e.g., the second camera 232) in operation 640. The second camera may be a camera having a second angle of view that is smaller than the first angle of view. According to an embodiment, the second camera may have a greatest angle of view among a plurality of cameras included in the electronic device.

If the second camera is activated, the electronic device may acquire a second image from the second camera via the image acquisition module 451. If the second image is acquired, the electronic device may generate a third image by cropping the second image via the image generation module 453 of the screen providing module 400, and may display the generated third image on the display via the image display module 455, in operation 650. The second image may be a reference image, and the third image may be a virtual preview image. For example, the third image may include an image corresponding a first angle of view and a third angle of view which are smaller than the second angle of view. The third image may include an image (e.g., an image that is not cropped) corresponding to the second angle of view. A method of displaying the third image may be identical or similar to description provided in operation 540 of FIG. 5.

In operation 660, the electronic device may determine whether a second input event has been generated, via the input acquisition module 430. In response to determining that the second input event has not occurred, the electronic device may return to operation 650 to display the third image on the display. At this time, the second image may be reacquired, and the third image may be regenerated.

In response to determining that the second input event has occurred, the electronic device may activate a third camera (e.g., the third camera 233) via the camera control module 410 in operation 670. The camera control module 410 may switch (or configure) the photographing camera from the first camera to the third camera. The third camera has an angle of view smaller than the second angle of view, and may be a camera selected by a user from among the plurality of cameras.

If the third camera is activated, the electronic device may acquire a fourth image from the third camera via the image acquisition module 451. If the fourth image is acquired, the electronic device may display, in operation 680, the acquired fourth image on the display via the image display module 455.

According to an embodiment, if the camera selected by the user from among the plurality of cameras is the first camera, the electronic device may omit execution of operation 670 and operation 680 and return to operation 620, and may display the first image on the display. At this time, the first image may be reacquired.

According to an embodiment, if the camera selected by the user from among the plurality of cameras is the second camera, the electronic device may omit execution of operation 670 and operation 680, and may display the second image acquired from the second camera on the display. At this time, the second image may be reacquired.

According to an embodiment, in operation 670, the electronic device may deactivate at least one of the first camera and the second camera. For example, the electronic device may deactivate the first camera configured to be the photographing camera, and may configure the third camera to be the photographing camera while activating the third camera. In some embodiments, the electronic device may switch at least one of the first camera and the second camera to the standby state, instead of deactivating the same.

Figure 7:
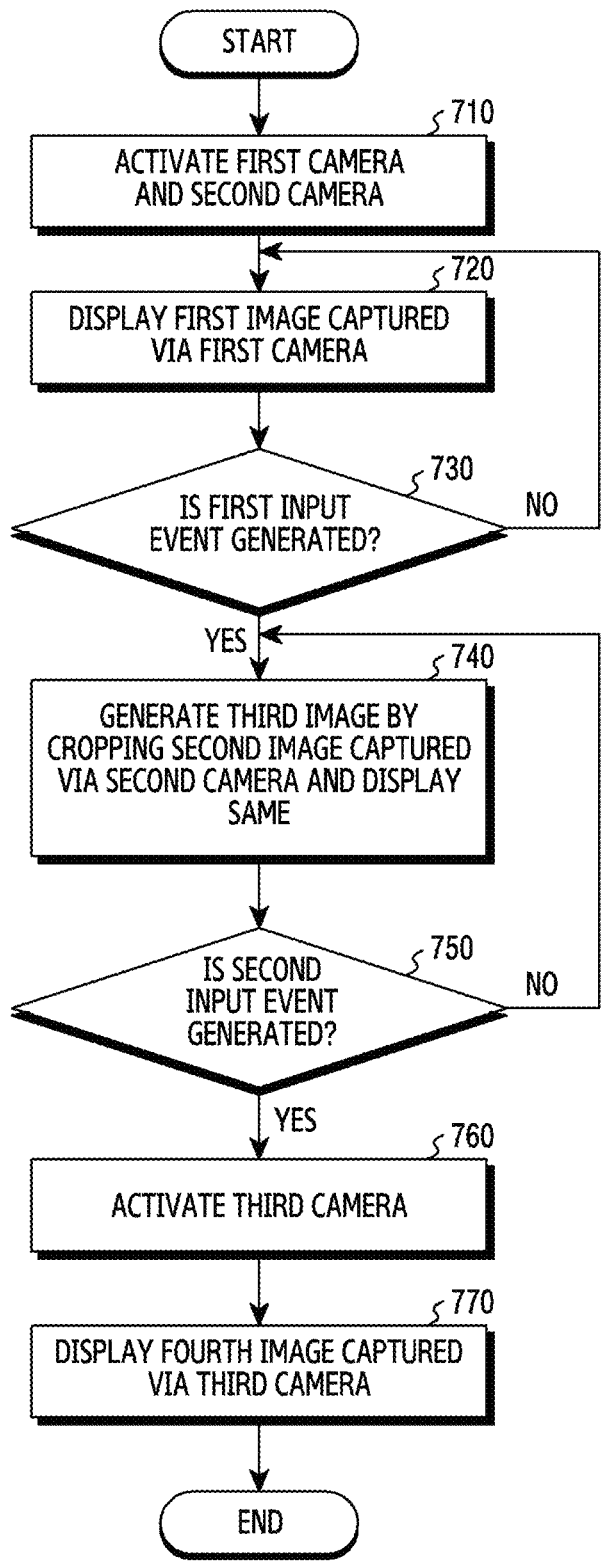
FIG. 7 illustrates a diagram for describing activation time points of a camera which provides a preview image and a camera which configures a preview screen according to an embodiment.

FIG. 7 illustrates a diagram for describing activation time points of a camera which provides a preview image and a camera which configures a preview screen according to an embodiment. In FIG. 7, the description of operations identical or similar to those in FIG. 5 and FIG. 6 may be omitted.

Referring to FIG. 7, an electronic device (e.g., the electronic device 101 or the electronic device 200) may activate, in operation 710, a first camera (e.g., the first camera 231) and a second camera (e.g., the second camera 232) via the camera control module 410 of the screen providing module 400. The first camera has a first angle of view, and may be a camera last used by a user. For example, the first camera may be a camera configured to be a photographing camera. The second camera may be a camera having a second angle of view that is smaller than the first angle of view. According to an embodiment, the second camera may have a greatest angle of view among a plurality of cameras included in the electronic device. According to an embodiment, the camera control module 410 may activate the second camera and then may switch the second camera to the standby state.

If the first camera (and the second camera) is activated, the electronic device may acquire a first image from the first camera via the image acquisition module 451 of the screen providing module 400. If the first image is acquired, the electronic device may display, in operation 720, the acquired first image on the display via the image display module 455 of the screen providing module 400.

In operation 730, the electronic device may determine whether a first input event has been generated, via the input acquisition module 430 of the screen providing module 400. In response to determining that the first input event has not occurred, the electronic device may return to operation 720 to display the first image on the display. At this time, the first image may be reacquired.

In response to determining that the first input event has occurred, the electronic device may acquire a second image from the second camera via the image acquisition module 451. If the second camera is in the standby state, the camera control module 410 may switch the second camera to the activation mode.

If the second image is acquired, the electronic device may generate a third image by cropping the second image via the image generation module 453 of the screen providing module 400, and may display the generated third image on the display via the image display module 455, in operation 740. The second image may be a reference image, and the third image may be a virtual preview image. For example, the third image may include an image corresponding a first angle of view and a third angle of view which are smaller than the second angle of view. The third image may include an image (e.g., an image that is not cropped) corresponding to the second angle of view. A method of displaying the third image may be identical or similar to description provided in operation 540 of FIG. 5.

In operation 750, the electronic device may determine whether a second input event has been generated, via the input acquisition module 430. In response to determining that the second input event has not occurred, the electronic device may return to operation 740 to display the third image on the display. At this time, the second image may be reacquired, and the third image may be regenerated.

In response to determining that the second input event has occurred, the electronic device may activate a third camera (e.g., the third camera 233) via the camera control module 410 in operation 760. The camera control module 410 may switch (or configure) the photographing camera from the first camera to the third camera. The third camera has an angle of view smaller than the second angle of view, and may be a camera selected by a user from among the plurality of cameras.

If the third camera is activated, the electronic device may acquire a fourth image from the third camera via the image acquisition module 451. If the fourth image is acquired, the electronic device may display, in operation 770, the acquired fourth image on the display via the image display module 455.

According to an embodiment, if the camera selected by the user from among the plurality of cameras is the first camera, the electronic device may omit execution of operation 760 and operation 770 and return to operation 720, and may display the first image on the display. At this time, the first image may be reacquired.

According to an embodiment, if the camera selected by the user from among the plurality of cameras is the second camera, the electronic device may omit execution of operation 760 and operation 770, and may display the second image acquired from the second camera on the display. At this time, the second image may be reacquired.

According to an embodiment, in operation 760, the electronic device may deactivate at least one of the first camera and the second camera. For example, the electronic device may deactivate the first camera configured to be the photographing camera, and may configure the third camera to be the photographing camera while activating the third camera. In some embodiments, the electronic device may switch at least one of the first camera and the second camera to the standby state, instead of deactivating the same.

Figure 8:
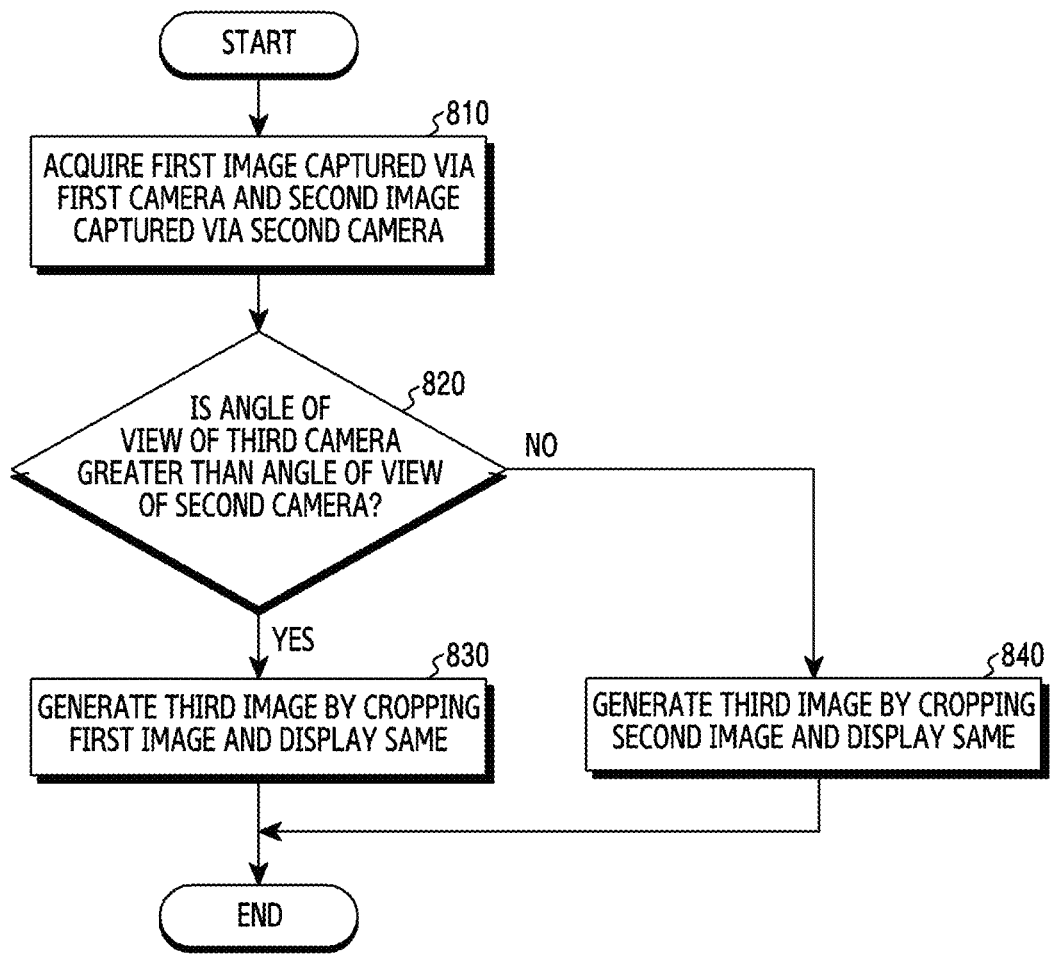
FIG. 8 illustrates a diagram for describing a method of configuring a preview screen related to camera selection, by using a plurality of cameras according to an embodiment.

FIG. 8 illustrates a diagram for describing a method of configuring a preview screen related to camera selection, by using a plurality of cameras according to an embodiment. In FIG. 8, a case in which an electronic device (e.g., the electronic device 101 or the electronic device 200) configures a plurality of cameras that acquire a reference image will be described.

Referring to FIG. 8, in operation 810, the electronic device may acquire a first image from a first camera (e.g., the first camera 231) having a first angle of view via the image acquisition module 451 of the screen providing module 400, and may acquire a second image from a second camera (e.g., the second camera 232) having a second angle of view that is smaller than the first angle of view.

In operation 820, the electronic device may determine whether a third angle of view of a third camera is greater than the second angle of view of the second camera via the image generation module 453 of the screen providing module 400. For example, the image generation module 453 may determine whether the third angle of view is smaller than the first angle of view, and is greater than the second angle of view.

In response to determining that the third angle of view is greater than the second angle of view (e.g., the first angle of view>the third angle of view>the second angle of view), the electronic device may generate a third image by cropping the first image in accordance with the third angle of view via the image generation module 453, and may display the generated third image on a display (e.g., the display device 160 or the display 250) via the image display module 455 of the screen providing module 400, in operation 830. The first image may be a reference image, and the third image may be a virtual preview image.

In response to determining that the third angle of view is not greater than the second angle of view (e.g., the first angle of view>the second angle of view>the third angle of view), the electronic device may generate a third image by cropping the second image in accordance with the third angle of view via the image generation module 453, and may display the generated third image on the display via the image display module 455 of the screen providing module 400, in operation 840. The second image may be a reference image, and the third image may be a virtual preview image.

According to an embodiment, when a preview screen related to camera selection is provided, if a plurality of reference images are used, the image generation module 453 generates a virtual preview image corresponding to a specific angle of view by using a reference image corresponding to an angle of view close (a relatively small value of difference in angle of view) to the specific angle of view from among reference images corresponding to an angle of view greater than the specific angle of view, so as to reduce image quality loss. For example, in operation 840 of FIG. 8, if the third angle of view is smaller than the first angle of view and the second angle of view, the third image may be generated by cropping the first image, which corresponds to the first angle of view, in accordance with the third angle of view. However, because the second angle of view is greater than the third angle of view, and closer to the third angle of view than to the first angle of view (a difference value between the second angle of view and the third angle of view is smaller than a difference value between the first angle of view and the third angle of view), a third image generated by cropping the second image in accordance with the third angle of view may be better in terms of image quality compared to a third image generated by cropping the first image in accordance with the third angle of view.

As described above, according to various embodiments, a method of providing a screen of an electronic device (e.g., the electronic device 101 or the electronic device 200) may include: in a state where a photographing direction of a first camera (e.g., the camera module 180 or the first camera 231) having a first angle of view and a photographing direction of a second camera (e.g., the camera module 180 or the second camera 232) having a second angle of view that is smaller than the first angle of view are substantially the same, activating the first camera; displaying a first image acquired via the first camera on a display (e.g., the display device 160 or the display 250); acquiring a second image by cropping the first image in according with the second angle of view, in response to reception of a first input event; displaying the second image on the display; activating the second camera in response to reception of a second input event; and displaying a third image acquired via the second camera on the display.

According to various embodiments, the first input event may be generated according to a first touch input made at a point on the screen of the display, and the second input event may be generated according to a second touch input made at a position where the second image of the screen is displayed.

According to various embodiments, the displaying of the second image on the display may include overlappingly arranging the second image in a partial area of the first image, so as to display the same on the display.

According to various embodiments, the first input event is generated at a first time point at which touch objects are contacted at two points on the screen of the display, and the second input event may be generated at a second time point at which the touch objects are moved in different directions from each other, and then separated from the screen.

According to various embodiments, the method of providing the screen may further include: acquiring a plurality of fourth images by cropping the first image in accordance with a plurality of angles of view included in the range of the first angle of view and the second angle of view; and displaying a fourth image, which corresponds to an angle of view matched to a distance of the touch objects from among the fourth images, on the display from the first time point to the second time point.

According to various embodiments, the method of providing the screen may further include deactivating the first camera or switching the first camera to the standby state, in response to reception of the second input event.

According to various embodiments, the method of providing the screen may further include, before reception of the first input event, activating the second camera and switching the activated second camera to the standby state.

According to various embodiments, the method of providing the screen may further include: in a state where a photographing direction of a third camera (e.g., the camera module 180 or the third camera 233) having a third angle of view greater than the first angle of view is substantially the same as a photographing direction of the first camera and a photographing direction of the second camera, activating the third camera in response to reception of the first input event; acquiring a fourth image from the activated third camera; acquiring a fifth image by cropping the fourth image in accordance with the first angle of view; acquiring the second image by cropping the fourth image in accordance with the second angle of view; and displaying at least one of the second image or the fifth image on the display.

According to various embodiments, the displaying of at least one of the second image or the fifth image on the display may further include: in a state where the second image and the fifth image are displayed on the display, applying a graphic effect to one of the second image and the fifth image on the basis of at least one of an object to be photographed or a user's preference.

According to various embodiments, the acquiring of the second image may include: in a state where a photographing direction of a third camera (e.g., the camera module 180 or the third camera 233) having a third angle of view which is smaller than the first angle of view but greater than the second angle of view is substantially the same as a photographing direction of the first camera and a photographing direction of the second camera, activating the third camera in response to reception of the first input event; acquiring a fourth image from the activated third camera; and acquiring the second image by cropping the fourth image in accordance with the second angle of view.

Figure 9:
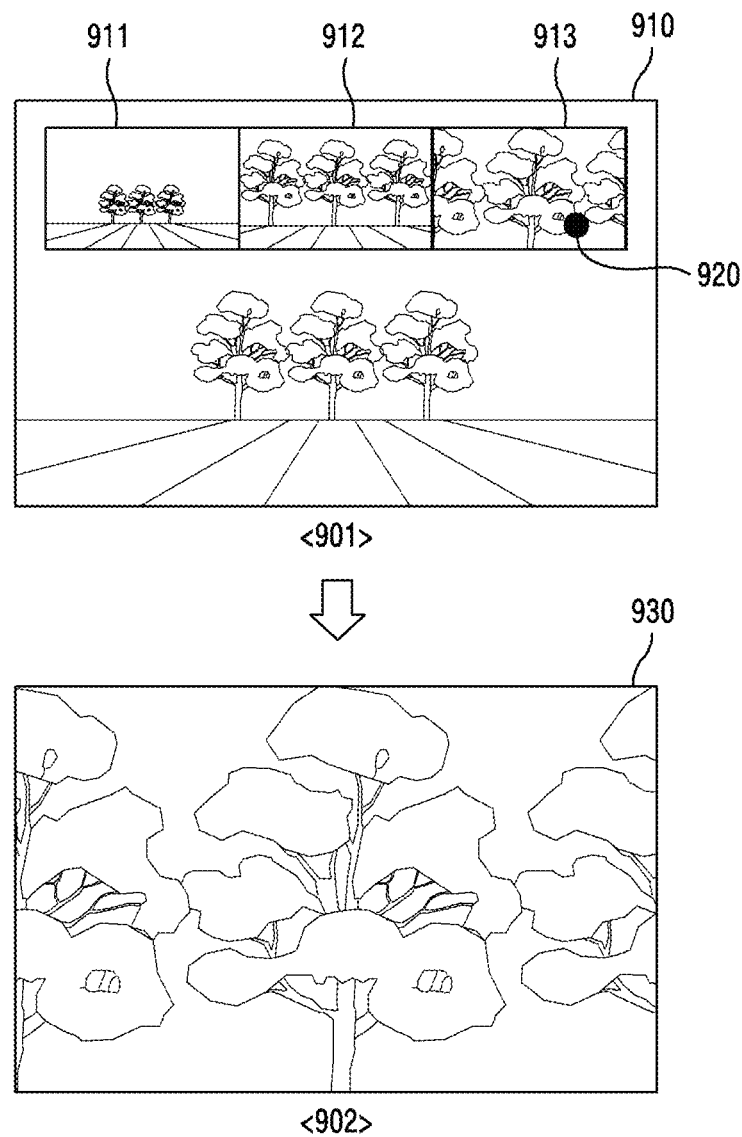
FIG. 9 is a diagram illustrating a screen that provides a preview screen related to camera selection, by using a camera which provides a preview image according to an embodiment.

FIG. 9 is a diagram illustrating a screen that provides a preview screen related to camera selection, by using a camera which provides a preview image according to an embodiment. The screen illustrated in FIG. 9 may correspond to the screen according to operations of FIG. 5. In FIG. 9, for the convenience of description, a state, in which an electronic device (e.g., the electronic device 101 or the electronic device 200) includes a first camera (e.g., the first camera 231) having a first angle of view, a second camera (e.g., the second camera 232) having a second angle of view smaller than the first angle of view, and a third camera (e.g., the third camera 233) having a third angle of view smaller than the second angle of view, will be described.

Referring to FIG. 9, the electronic device may activate the first camera via the camera control module 410 of the screen providing module 400, and may acquire a first preview image 910 from the first camera via the image acquisition module 451 of the screen providing module 400. The electronic device may display the first preview image 910 on a display (e.g., the display device 160 or the display 250) of the electronic device via the image display module 455 of the screen providing module 400. The first camera may be a camera used last by a user. For example, the first camera may be a camera configured to be a photographing camera.

If a first input event is received via the input acquisition module 430 of the screen providing module 400, the electronic device may generate a first virtual preview image 911 corresponding to the first angle of view by resizing the first preview image 910, may generate a second virtual preview image 912 by cropping the first preview image 910 in accordance with the second angle of view and then resizing the same, and may generate a third virtual preview image 913 by cropping the first preview image 910 in accordance with the third angle of view and then resizing the same, via the image generation module 453 of the screen providing module 400. The first input event may include a first key input event received via a physical key included in an input device (e.g., the input device 150) of the electronic device, a first voice input event received via a microphone included in the input device, and a first touch input event (e.g., a first single touch-down event or a first single touch-up event) received via the display.

When the first virtual preview image 911, the second virtual preview image 912, and the third virtual preview image 913 are generated, the electronic device may display the first virtual preview image 911, the second virtual preview image 912, and the third virtual preview image 913 overlappingly in a predetermined area (e.g., an upper area) of the first preview image 910 on the display via the image display module 455, as shown in a first state 901.

In a state where the first virtual preview image 911, the second virtual preview image 912, and the third virtual preview image 913 are displayed on the display, the electronic device may receive a second input event via the input acquisition module 430. The second input event may include a second key input event received via the physical key, a second voice input event received via the microphone, and a second touch input event (e.g., a second single touch-down event or a second single touch-up event) received via the display. FIG. 9 illustrates a case where the second input event is a touch input event (e.g., a second single touch-down event or a second single touch-up event) generated according to a touch input 920 for selecting the third virtual preview image 913 from among the first virtual preview image 911, the second virtual preview image 912, and the third virtual preview image 913, which is displayed on the display.

If the second input event is received, the electronic device may activate, via the camera control module 410, the third camera selected by a user, and may acquire a second preview image 930 from the third camera via the image acquisition module 451. The electronic device may display the second preview image 930 on the display via the image display module 455, as shown in a second state 902. The camera control module 410 may switch (or configure) the photographing camera from the first camera to the third camera.

According to an embodiment, if a camera selected by a user is the first camera, the electronic device may display the first preview image 910, from which the first virtual preview image 911, the second virtual preview image 912, and the third virtual preview image 913 have been removed, on the display via the image display module 455.

Figure 10:
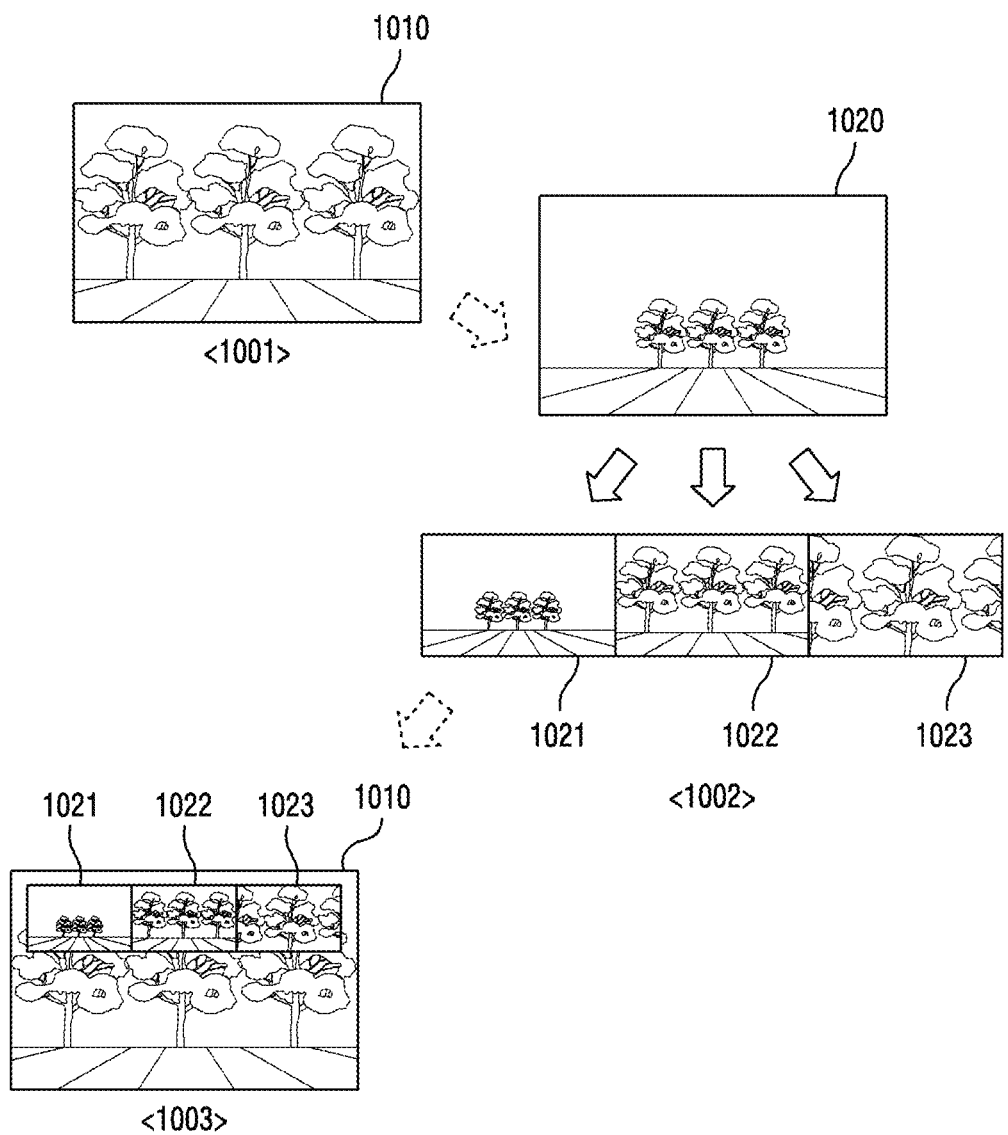
FIG. 10 is a diagram illustrating a screen that provides a preview screen related to camera selection, by using a camera having an angle of view greater than that of a camera which provides a preview image according to an embodiment.

FIG. 10 is a diagram illustrating a screen that provides a preview screen related to camera selection, by using a camera having an angle of view greater than that of a camera which provides a preview image according to an embodiment. The screen illustrated in FIG. 10 may correspond to the screen according to operations of FIG. 6 or FIG. 7. In FIG. 10, for the convenience of description, a state, in which an electronic device (e.g., the electronic device 101 or the electronic device 200) includes a first camera (e.g., the first camera 231) having a first angle of view, a second camera (e.g., the second camera 232) having a second angle of view, and a third camera (e.g., the third camera 233) having a third angle of view, wherein the second angle of view is greater than the first angle of view and the third angle of view, will be described.

Referring to FIG. 10, the electronic device may activate the first camera via the camera control module 410 of the screen providing module 400, and may acquire a first preview image 1010 from the first camera via the image acquisition module 451 of the screen providing module 400. As shown in a first state 1001, the electronic device may display the first preview image 1010 on a display (e.g., the display device 160 or the display 250) of the electronic device via the image display module 455 of the screen providing module 400. The first camera may be a camera used last by a user. For example, the first camera may be a camera configured to be a photographing camera. According to an embodiment, the camera control module 410 may activate the second camera and may switch the same to a standby state.

If a first input event is received via the input acquisition module 430 of the screen providing module 400, the electronic device may check a state of the second camera via the camera control module 410. If the second camera is in a deactivation state, the camera control module 410 may activate the second camera, and if the second camera is in a standby state, the camera control module 410 may switch the second camera to an activation state. If the second camera is in the activation state, the electronic device may acquire a reference image 1020 from the second camera via the image acquisition module 451.

If the reference image 1020 is acquired, the electronic device may generate a first virtual preview image 1021 corresponding to the second angle of view by resizing the reference image 1020, may generate a second virtual preview image 1022 by cropping the reference image 1020 in accordance with the first angle of view and then resizing the same, and may generate a third virtual preview image 1023 by cropping the reference image 1020 in accordance with the third angle of view and then resizing the same, via the image generation module 453 of the screen providing module 400, as shown in a second state 1002. The first input event may include a first key input event received via a physical key included in an input device (e.g., the input device 150) of the electronic device, a first voice input event received via a microphone included in the input device, and a first touch input event (e.g., a first single touch-down event or a first single touch-up event) received via the display.

When the first virtual preview image 1021, the second virtual preview image 1022, and the third virtual preview image 1023 are generated, the electronic device may display the first virtual preview image 1021, the second virtual preview image 1022, and the third virtual preview image 1023 overlappingly in a predetermined area (e.g., an upper area) of the first preview image 1010 on the display via the image display module 455, as shown in a third state 1003.

Although not illustrated, in a state where the first virtual preview image 1021, the second virtual preview image 1022, and the third virtual preview image 1023 are displayed on the display, the electronic device may receive a second input event via the input acquisition module 430. The second input event may include a second key input event received via the physical key, a second voice input event received via the microphone, and a second touch input event (e.g., a second single touch-down event or a second single touch-up event) received via the display.

If the second input event is received, the electronic device may activate, via the camera control module 410, a camera selected by a user, and may acquire a second preview image from the selected camera via the image acquisition module 451. The electronic device may display the second preview image on the display via the image display module 455. The camera control module 410 may switch (or configure) a photographing camera from the first camera to the selected camera.

According to an embodiment, if the camera selected by the user is the first camera, the electronic device may display the first preview image 1010 on the display via the image display module 455, and if the camera selected by the user is the second camera, the electronic device may display the reference image 1020 as a preview image on the display via the image display module 455.

Figure 11:
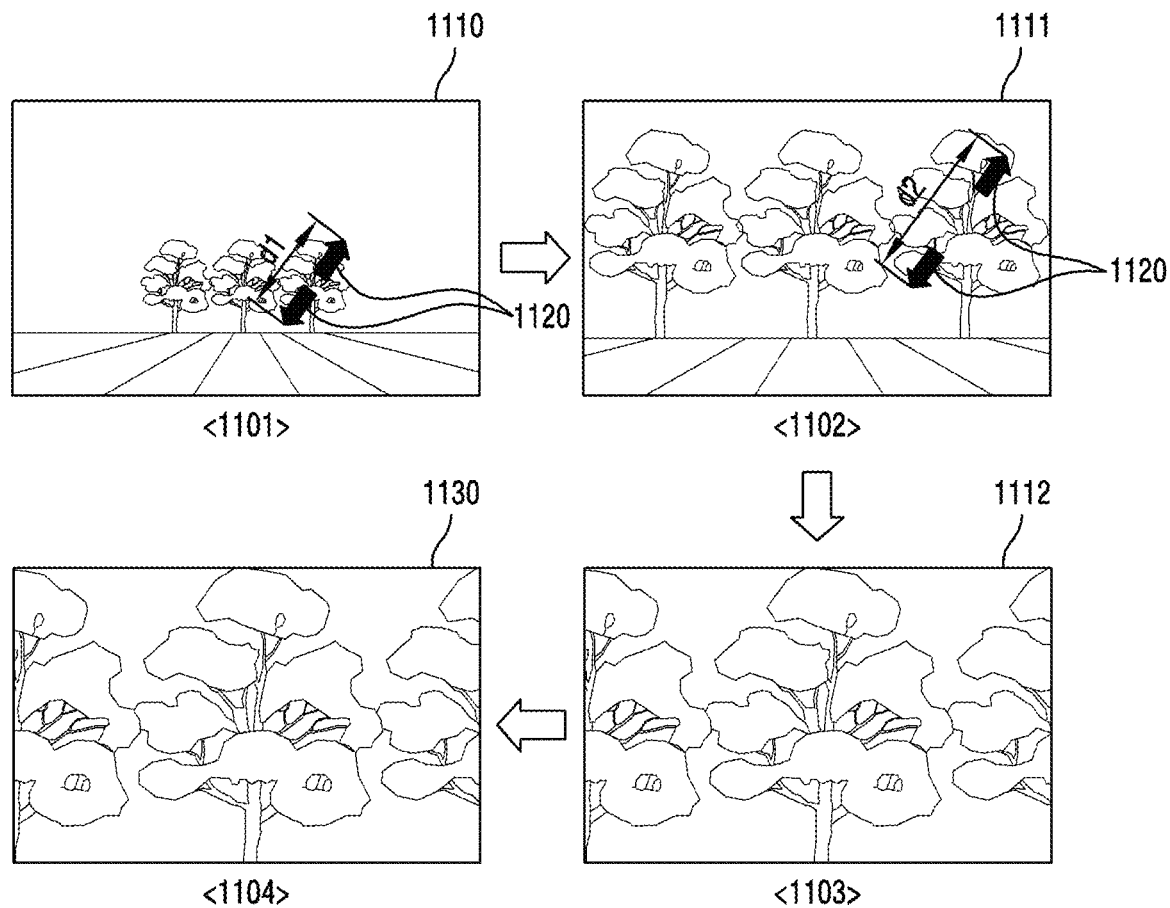
FIG. 11 is another diagram illustrating a screen that provides a preview screen related to camera selection, by using a camera which provides a preview image according to an embodiment.

FIG. 11 is another diagram illustrating a screen that provides a preview screen related to camera selection, by using a camera which provides a preview image according to an embodiment. The screen illustrated in FIG. 11 may correspond to the screen according to operations of FIG. 5. In FIG. 11, for the convenience of description, a state, in which an electronic device (e.g., the electronic device 101 or the electronic device 200) includes a first camera (e.g., the first camera 231) having a first angle of view, a second camera (e.g., the second camera 232) having a second angle of view smaller than the first angle of view, and a third camera (e.g., the third camera 233) having a third angle of view smaller than the second angle of view, will be described.

Referring to FIG. 11, the electronic device may activate the first camera via the camera control module 410 of the screen providing module 400, and may acquire a first preview image 1110 from the first camera via the image acquisition module 451 of the screen providing module 400. As shown in a first state 1101, the electronic device may display the first preview image 1110 on a display (e.g., the display device 160 or the display 250) of the electronic device via the image display module 455 of the screen providing module 400. The first camera may be a camera used last by a user. For example, the first camera may be a camera configured to be a photographing camera.

The electronic device may receive a first input event via the input acquisition module 430 of the screen providing module 400. The first input event may include an event (e.g., a multi-touch-down event) related to a start of a pinch gesture input 1120 received via the display. The pinch gesture input 1120 may be an input of, while pressing two points on the screen of the display by using touch objects (e.g., two fingers), moving the touch objects by a predetermined distance and then releasing the same. For example, the input acquisition module 430 may receive the first input event at a point in time when the touch objects touch the screen of the display. The pinch gesture input may be divided into a pinch-in input and a pinch-out input according to a direction in which the touch objects are moved. FIG. 11 shows, as in a first state 1101, a state where a pinch-out input 1120, in which the touch objects move away from each other, is made.

If an event related to a start of the pinch gesture input 1120 is received, the electronic device may generate a first virtual preview image 1111 by cropping the first preview image 1110 in accordance with the second angle of view and then resizing the same, and may generate a second virtual preview image 1112 by cropping the first preview image 1110 in accordance with the third angle of view and then resizing the same, via the image generation module 453 of the screen providing module 400. According to an embodiment, the image generation module 453 may generate a plurality of virtual preview images by cropping the first preview image 1110 in accordance with a plurality of angles of view included in the range of the first angle of view to the third angle of view, and then resizing the same.

If the plurality of virtual preview images including the first virtual preview image 1111 and the second virtual preview image 1112 are generated, the electronic device may display, according to a distance d1 or d2 of touch objects of the pinch gesture input 1120, a virtual preview image corresponding to an angle of view matched to the distance, on the display via the image display module 455 of the electronic device. For example, if the distance of the touch objects is a first distance d1, the image display module 455 may display, on the display, the first virtual preview image 1111 corresponding to the second angle of view matched to the first distance d1, as shown in a second state 1102. If the distance of the touch objects is a second distance d2, the image display module 455 may display, on the display, the second virtual preview image 1112 corresponding to the third angle of view matched to the second distance d2, as shown in a third state 1103. Although not illustrated, from after the touch objects are in contact with the display to generation of the first distance d1, the image display module 455 may sequentially display, on the display, virtual preview images corresponding to a plurality of angles of view between the first angle of view and the second angle of view. Further, from a time at which the touch objects are in the first distance d1 to a time at which the touch objects are in the second distance d2, the image display module 455 may sequentially display, on the display, virtual preview images corresponding to a plurality of angles of view between the second angle of view and the third angle of view.

In a state where one of the virtual preview images is displayed on the display, the electronic device may receive a second input event via the input acquisition module 430. The second input event may include an event (e.g., a multi-touch-up event) related to an end of the pinch gesture input 1120 received via the display. For example, the input acquisition module 430 may receive the second input event at a point in time when the touch objects touch are separated on the screen of the display.

If the second input event is received, the electronic device may activate, via the camera control module 410, a camera (e.g., the third camera) selected by a user, and may acquire a second preview image 1130 from the selected camera via the image acquisition module 451. The electronic device may display the second preview image 1130 on the display via the image display module 455, as shown in a fourth state 1104. The camera control module 410 may switch (or configure) a photographing camera from the first camera to the selected camera. The camera selected by the user may be a camera having an angle of view corresponding to a virtual preview image displayed on the display at a point of time when the touch objects are separated on the screen of the display (a point of time when the second input event is received). FIG. 11 shows, as in a fourth state 1104, a state in which the third camera is selected, the third camera having a third angle of view corresponding to the second virtual preview image 1112 displayed on the display at a point of time when the touch objects are separated on the screen of the display.

According to an embodiment, if the camera selected by the user is the first camera, the electronic device may display the first preview image 1110 on the display via the image display module 455.

Figure 12:
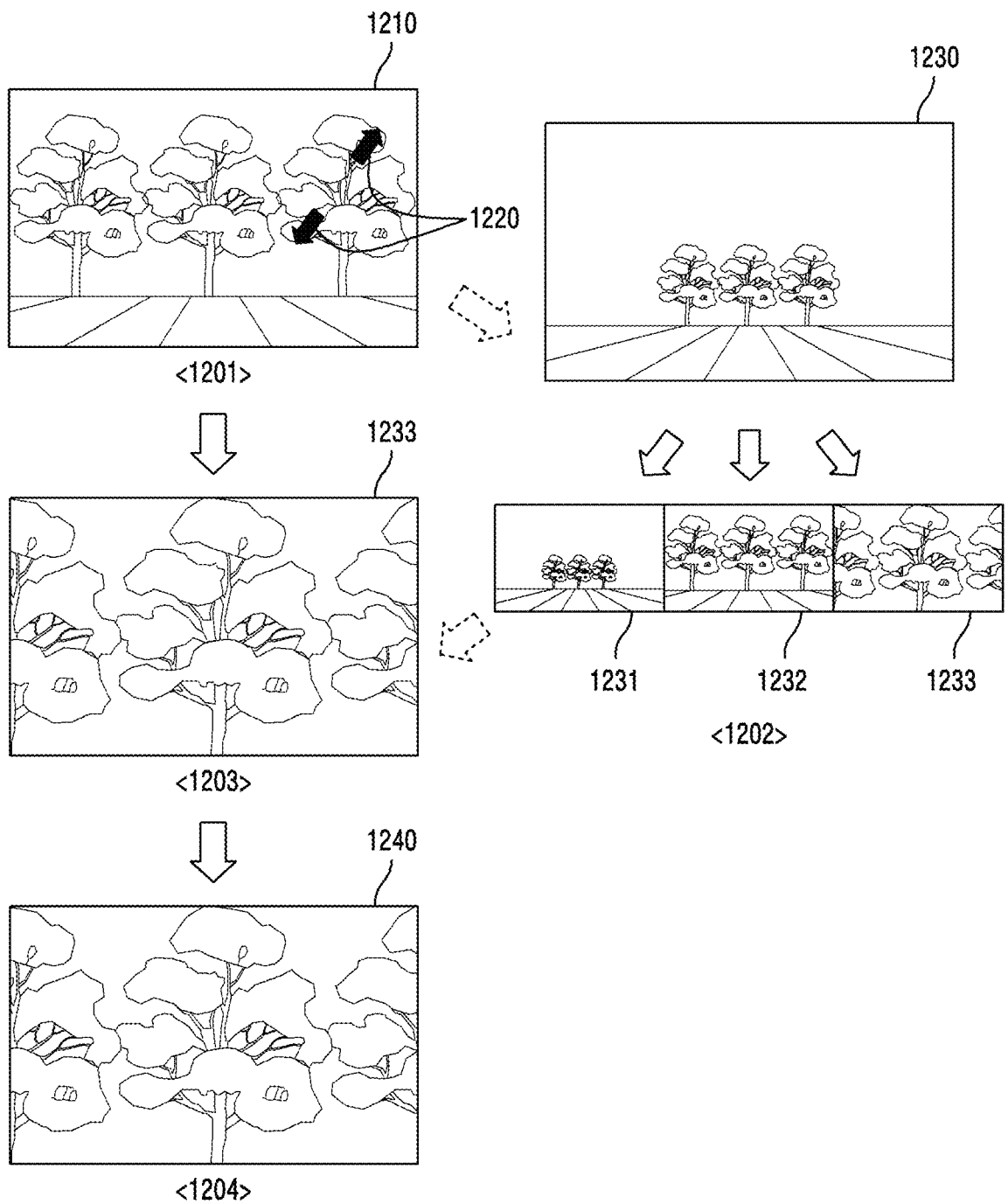
FIG. 12 is another diagram illustrating a screen that provides a preview screen related to camera selection, by using a camera having an angle of view greater than that of a camera which provides a preview image according to an embodiment.

FIG. 12 is another diagram illustrating a screen that provides a preview screen related to camera selection, by using a camera having an angle of view greater than that of a camera which provides a preview image according to an embodiment. The screen illustrated in FIG. 12 may correspond to the screen according to operations of FIG. 6 or FIG. 7. In FIG. 12, for the convenience of description, a state, in which an electronic device (e.g., the electronic device 101 or the electronic device 200) includes a first camera (e.g., the first camera 231) having a first angle of view, a second camera (e.g., the second camera 232) having a second angle of view, and a third camera (e.g., the third camera 233) having a third angle of view, wherein the second angle of view is greater than the first angle of view and the third angle of view, will be described.

Referring to FIG. 12, the electronic device may activate the first camera via the camera control module 410 of the screen providing module 400, and may acquire a first preview image 1210 from the first camera via the image acquisition module 451 of the screen providing module 400. As shown in a first state 1201, the electronic device may display the first preview image 1210 on a display (e.g., the display device 160 or the display 250) of the electronic device via the image display module 455 of the screen providing module 400. The first camera may be a camera used last by a user. For example, the first camera may be a camera configured to be a photographing camera. According to an embodiment, the camera control module 410 may activate the second camera and may switch the same to a standby state.

The electronic device may receive a first input event via the input acquisition module 430 of the screen providing module 400. The first input event may include an event (e.g., a multi-touch-down event) related to a start of a pinch gesture input 1220 received via the display.

If the first input event is received, the electronic device may acquire a state of the second camera via the camera control module 410. If the second camera is in a deactivation state, the camera control module 410 may activate the second camera, and if the second camera is in a standby state, the camera control module 410 may switch the second camera to an activation state. If the second camera is in the activation state, the electronic device may acquire a reference image 1230 from the second camera via the image acquisition module 451.

If the reference image 1230 is acquired, the electronic device may generate a first virtual preview image 1231 corresponding to the second angle of view by using the reference image 1230, may generate a second virtual preview image 1232 by cropping the reference image 1230 in accordance with the first angle of view and then resizing the same, and may generate a third virtual preview image 1233 by cropping the reference image 1230 in accordance with the third angle of view and then resizing the same, via the image generation module 453 of the screen providing module 400, as shown in a second state 1202. According to an embodiment, the image generation module 453 may generate a plurality of virtual preview images by cropping the reference image 1230 in accordance with a plurality of angles of view included in the range of the first angle of view to the third angle of view, and then resizing the same.

If the plurality of virtual preview images including the first virtual preview image 1231, the second virtual preview image 1232, and the third virtual preview image 1233 are generated, the electronic device may display, according to a distance of touch objects of the pinch gesture input 1220, a virtual preview image corresponding to an angle of view matched to the distance, on the display via the image display module 455 of the electronic device. For example, as shown in a third state 1203, the image display module 455 may display, on the display, the third virtual preview image 1233 corresponding to the third angle of view matched to the distance. Although not illustrated, from after the touch objects are in contact with the display to generation of the distance, the image display module 455 may sequentially display, on the display, virtual preview images corresponding to a plurality of angles of view between the first angle of view and the third angle of view.

In a state where one of the virtual preview images is displayed on the display, the electronic device may receive a second input event via the input acquisition module 430. The second input event may include an event (e.g., a multi-touch-up event) related to an end of the pinch gesture input 1220 received via the display. For example, the input acquisition module 430 may receive the second input event at a point in time when the touch objects are separated on the screen of the display.

If the second input event is received, the electronic device may activate, via the camera control module 410, a camera (e.g., the third camera) selected by a user, and may acquire a second preview image 1240 from the selected camera via the image acquisition module 451. The electronic device may display the second preview image 1240 on the display via the image display module 455, as shown in a fourth state 1204. The camera control module 410 may switch (or configure) a photographing camera from the first camera to the selected camera. The camera selected by the user may be a camera having an angle of view corresponding to a virtual preview image displayed on the display at a point of time when the touch objects are separated on the screen of the display (a point of time when the second input event is received). FIG. 12 shows, as in a fourth state 1204, a state in which the third camera is selected, the third camera having a third angle of view corresponding to the third virtual preview image 1233 displayed on the display at a point of time when the touch objects are separated on the screen of the display.

According to an embodiment, if the camera selected by the user is the first camera, the electronic device may display the first preview image 1210 on the display via the image display module 455, and if the camera selected by the user is the second camera, the electronic device may display the reference image 1230 as a preview image on the display via the image display module 455.

Figure 13:
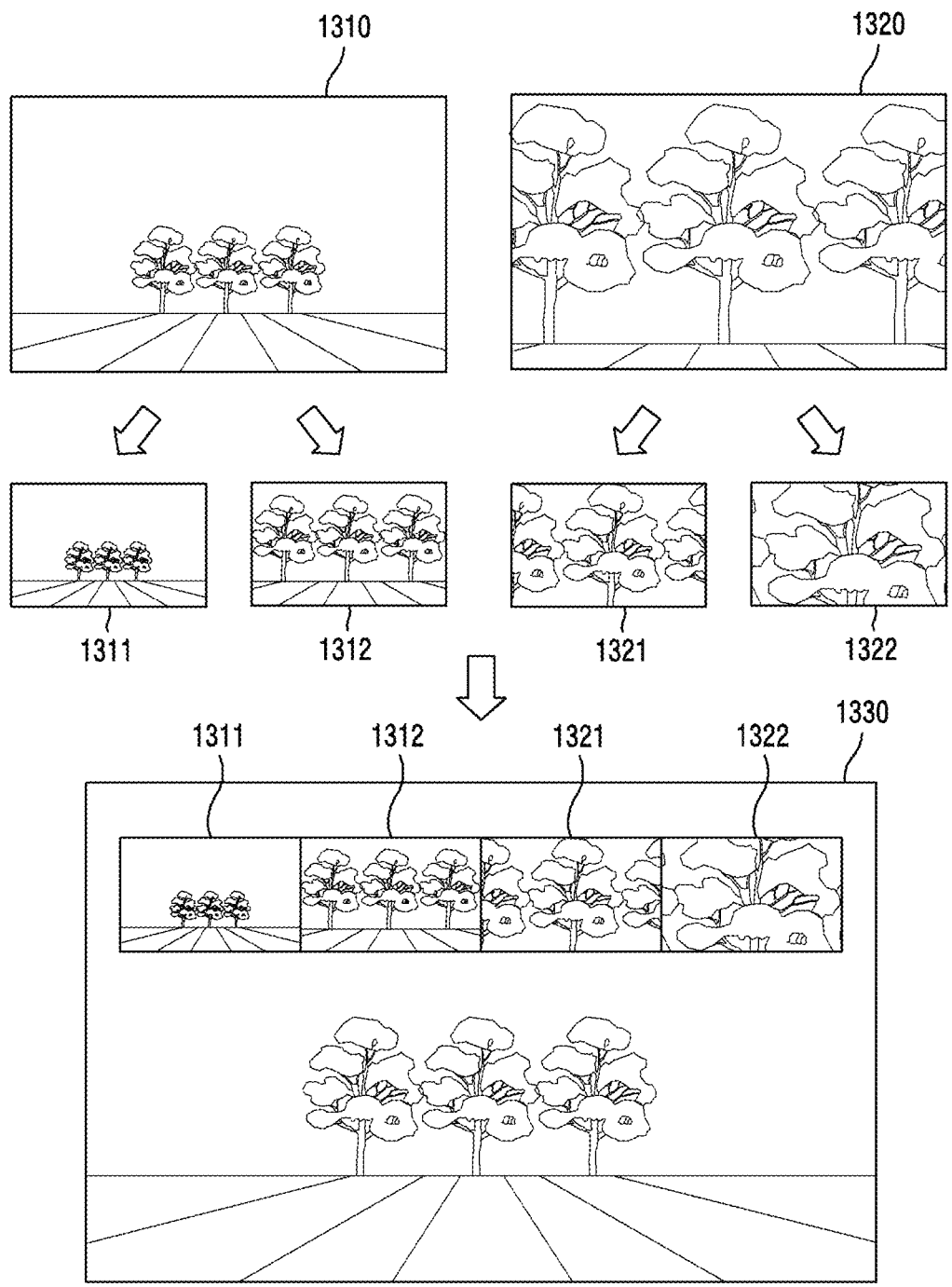
FIG. 13 is a diagram illustrating a screen that describes a method of configuring a preview screen related to camera selection, by using a plurality of cameras according to an embodiment.

FIG. 13 is a diagram illustrating a screen that describes a method of configuring a preview screen related to camera selection, by using a plurality of cameras according to an embodiment. The screen illustrated in FIG. 13 may correspond to the screen according to operations of FIG. 8. In FIG. 13, for the convenience of description, a state, in which an electronic device (e.g., the electronic device 101 or the electronic device 200) includes a first camera (e.g., the first camera 231) having a first angle of view, a second camera (e.g., the second camera 232) having a second angle of view smaller than the first angle of view, a third camera (e.g., the third camera 233) having a third angle of view smaller than the second angle of view, and a fourth camera having a fourth angle of view smaller than the third angle of view, will be described.

Referring to FIG. 13, the electronic device may acquire a first image 1310 from the first camera and may acquire a second image 1320 from the third camera, via the image acquisition module 451 of the screen providing module 400. The first image 1310 and the second image 1320 may be reference images.

The electronic device may compare an angle of view of a camera that is to generate a virtual preview image with an angle of view of a camera that provides a reference image, via the image generation module 453 of the screen providing module 400. For example, the image generation module 453 may determine whether the second angle of view is greater than the third angle of view, and may determine whether the fourth angle of view is greater than the third angle of view.

The image generation module 453 may generate a virtual preview image by using reference images corresponding to angles of view adjacent to each other (a relatively small value of difference in angle of view) from among reference images corresponding to an angle of view greater than that of the camera that is to generate the virtual preview image. For example, in response to determining that the second angle of view is greater than the third angle of view (the first angle of view>the second angle of view>the third angle of view), the image generation module 453 may generate a second virtual preview image 1312 by cropping the first image 1310 in accordance with the second angle of view. In response to determining that the fourth angle of view is smaller than the third angle of view (the first angle of view>the third angle of view>the fourth angle of view), the image generation module 453 may generate a fourth virtual preview image 1322 by cropping the second image 1320 in accordance with the fourth angle of view. According to an embodiment, the image generation module 453 may generate a first virtual preview image 1311 by using the first image 1310, and may generate a third virtual preview image 1321 by using the second image 1320.

The electronic device may display the virtual preview image on a display (e.g., the display device 160 or the display 250) via the image display module 455 of the screen providing module 400. For example, the image display module 455 may display the first virtual preview image 1311, the second virtual preview image 1312, the third virtual preview image 1321, and the fourth virtual preview image 1322 on the display so as to overlap in a specific area (e.g., an upper area) of a preview image 1330 acquired from a photographing camera. FIG. 13 illustrates a state in which the first camera is configured as the photographing camera, and the preview image 1330 is the first image 1310 acquired from the first camera.

Figure 14:
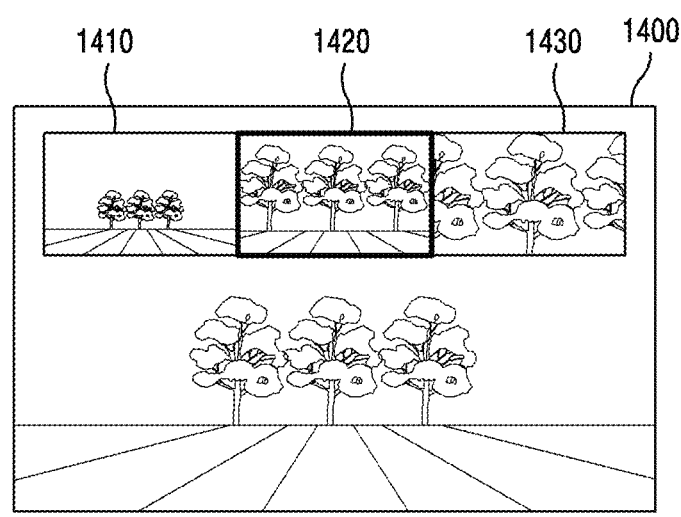
FIG. 14 is a diagram illustrating a screen that provides information of a recommended angle of view via a preview screen related to camera selection according to an embodiment.

FIG. 14 is a diagram illustrating a screen that provides information of a recommended angle of view via a preview screen related to camera selection according to an embodiment.

Referring to FIG. 14, an electronic device (e.g., the electronic device 101 or the electronic device 200) may display a preview screen 1400 including a virtual preview image (e.g., the first virtual preview image 1410, the second virtual preview image 1420, or the third virtual preview image 1430) on a display (e.g., the display device 160 or the display 250) via the image display module 455 of the screen providing module 400. For example, as illustrated, the image display module 455 may display the first virtual preview image 1410 corresponding to a first angle of view, the second virtual preview image 1420 corresponding to a second angle of view smaller than the first angle of view, and the third virtual preview image 1430 corresponding to a third angle of view smaller than the second angle of view on the display so as to overlap in a partial area (e.g., an upper area) of the preview screen 1400.

According to an embodiment, the electronic device may recommend an angle of view to a user via the screen providing module 400. For example, the screen providing module 400 may recommend an angle of view according to an object to be photographed. For example, if the object to be photographed includes a person, the screen providing module 400 may recommend a narrow angle (e.g., the third angle of view) so that the person may be photographed in priority, and if the object to be photographed is a landscape, the screen providing module 400 may recommend a wide angle (e.g., first angle of view). As another example, the screen providing module 400 may recommend an angle of view according to a user's preference. For example, the screen providing module 400 may recommend an angle of view that the user frequently selects depending on an object to be photographed. FIG. 14 illustrates a state in which the second angle of view has been recommended by the screen providing module 400 from among the first angle of view, the second angle of view, and the third angle of view.

According to an embodiment, the electronic device may apply a graphic effect to a virtual preview image corresponding to the recommended angle of view from among virtual preview images displayed on the display via the image display module 455. For example, the image display module 455 may display a border thickness and a border color of the virtual preview image corresponding to the recommended angle of view differently from other virtual preview images. FIG. 14 illustrates a state in which the image display module 455 displays the border thickness of the second virtual preview image 1420 corresponding to the recommended second angle of view thicker than the border thickness of the first virtual preview image 1410 and the border thickness of the third virtual preview image 1430.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing;
a first camera having a first angle of view;
a second camera having a second angle of view that is smaller than the first angle of view;
a display with a touchable screen; and
a processor connected to the first camera, the second camera, and the display,
wherein the processor is configured to:
based on being in a state where a photographing direction of the first camera and a photographing direction of the second camera are substantially the same, activate the first camera;
display a first image acquired via the first camera on the display;
while the second camera is not activated, acquire a second image by cropping the first image to have the second angle of view, in response to reception of a first input event;
while the second camera is not activated, concurrently display the second image with the first image on the display;
activate the second camera in response to reception of a second input event; and
display a third image acquired via the second camera on the display.

2. The electronic device of claim 1, wherein:
the first input event is generated according to a first touch input made at a point on the touchable screen of the display; and
the second input event is generated according to a second touch input made at a position where the second image is displayed on the touchable screen.

3. The electronic device of claim 2, wherein the processor is further configured to arrange the second image overlappingly in a partial area of the first image displayed on the display.

4. The electronic device of claim 1, wherein:
the first input event is generated at a first time point at which touch objects are contacted at two points on the touchable screen of the display; and
the second input event is generated at a second time point at which the touch objects are moved in different directions from each other and then separated from the touchable screen.

5. The electronic device of claim 4, wherein the processor is further configured to:
acquire a plurality of fourth images by cropping the first image to have a plurality of angles of view included in a range of the first angle of view and the second angle of view; and
display a fourth image, that corresponds to an angle of view matched to a distance between the touch objects from among the fourth images, on the display from the first time point to the second time point.

6. The electronic device of claim 1, wherein the processor is further configured to deactivate the first camera or switch the first camera to a standby state in response to reception of the second input event.

7. The electronic device of claim 1, wherein the processor is further configured to activate the second camera and switch the activated second camera to a standby state before reception of the first input event.

8. The electronic device of claim 1, further comprising a third camera that is connected to the processor and has a third angle of view that is greater than the first angle of view,
wherein the processor is further configured to:
based on a photographing direction of the third camera being substantially the same as a photographing direction of the first camera and a photographing direction of the second camera, activate the third camera in response to reception of the first input event;
acquire a fourth image from the activated third camera;
acquire a fifth image by cropping the fourth image in accordance with the first angle of view;
acquire the second image by cropping the fourth image in accordance with the second angle of view; and
display at least one of the second image and the fifth image on the display.

9. The electronic device of claim 8, wherein the processor is further configured to, based on the second image and the fifth image being displayed on the display, apply a graphic effect to one of the second image and the fifth image on a basis of at least one of an object to be photographed or a user's preference.

10. The electronic device of claim 1, further comprising: a third camera that is connected to the processor and has a third angle of view that is smaller than the first angle of view and greater than the second angle of view,
wherein the processor is further configured to:
based on a photographing direction of the third camera being substantially the same as a photographing direction of the first camera and a photographing direction of the second camera, activate the third camera in response to reception of the first input event;
acquire a fourth image from the activated third camera; and
acquire the second image by cropping the fourth image in accordance with the second angle of view.

11. A screen providing method of an electronic device, the method comprising:
based on being in a state where a photographing direction of a first camera having a first angle of view and a photographing direction of a second camera having a second angle of view that is smaller than the first angle of view are substantially the same, activating the first camera;
displaying a first image acquired via the first camera on a display;
while the second camera is not activated, acquiring a second image by cropping the first image to have the second angle of view, in response to reception of a first input event;
while the second camera is not activated, concurrently displaying the second image with the first image on the display;
activating the second camera in response to reception of a second input event; and
displaying a third image acquired via the second camera on the display.

12. The screen providing method of claim 11, wherein:
the first input event is generated according to a first touch input made at a point on a screen of the display;
and the second input event is generated according to a second touch input made at a position where the second image is displayed on the screen.

13. The screen providing method of claim 12, wherein the displaying of the second image on the display comprises arranging the second image overlappingly in a partial area of the first image displayed on the display.

14. The screen providing method of claim 11, wherein:
the first input event is generated at a first time point at which touch objects are contacted at two points on the screen of the display; and
the second input event is generated at a second time point at which the touch objects are moved in different directions from each other and then separated from the screen.

15. The screen providing method of claim 14, further comprising:
acquiring a plurality of fourth images by cropping the first image to have a plurality of angles of view included in a range of the first angle of view and the second angle of view; and
displaying a fourth image, that corresponds to an angle of view matched to a distance between the touch objects from among the fourth images, on the display from the first time point to the second time point.

16. The screen providing method of claim 11, further comprising deactivating the first camera or switching the first camera to a standby state in response to reception of the second input event.

17. The screen providing method of claim 11, further comprising activating the second camera and switching the activated second camera to a standby state before reception of the first input event.

18. The screen providing method of claim 11, further comprising:
based on a photographing direction of a third camera having a third angle of view that is greater than the first angle of view being substantially the same as a photographing direction of the first camera and a photographing direction of the second camera, activating the third camera in response to reception of the first input event;

acquiring a fourth image from the activated third camera;

acquiring a fifth image by cropping the fourth image in accordance with the first angle of view;

acquiring the second image by cropping the fourth image in accordance with the second angle of view; and displaying at least one of the second image and the fifth image on the display.

19. The screen providing method of claim 18, wherein the displaying of at least one of the second image or the fifth image on the display further comprises, based on the second image and the fifth image being displayed on the display, applying a graphic effect to one of the second image and the fifth image on a basis of at least one of an object to be photographed or a user's preference.

20. The screen providing method of claim 11, wherein the acquiring of the second image comprises:

based on a photographing direction of a third camera having a third angle of view that is smaller than the first angle of view and greater than the second angle of view is substantially the same as a photographing direction of the first camera and a photographing direction of the second camera, activating the third camera in response to reception of the first input event;

acquiring a fourth image from the activated third camera; and acquiring the second image by cropping the fourth image in accordance with the second angle of view.

* * * * *